US005476591A

United States Patent [19]
Green

[11] Patent Number: 5,476,591
[45] Date of Patent: * Dec. 19, 1995

[54] LIQUID TREATMENT SYSTEM AND METHOD FOR OPERATING THE SAME

[75] Inventor: Dennis H. Green, Arvada, Colo.

[73] Assignee: Harrison Western Environmental Services, Inc., Lakewood, Colo.

[ * ] Notice: The portion of the term of this patent subsequent to May 10, 2011, has been disclaimed.

[21] Appl. No.: 238,380

[22] Filed: May 5, 1994

Related U.S. Application Data

[63] Continuation-in-part of Ser. No. 67,055, May 25, 1993, Pat. No. 5,310,486.

[51] Int. Cl.[6] .................................................... B01D 61/20
[52] U.S. Cl. ........................ 210/638; 210/639; 210/651; 210/652
[58] Field of Search ................................ 210/638, 651, 210/652, 639; 502/426

[56] References Cited

U.S. PATENT DOCUMENTS

| | | |
|---|---|---|
| 3,928,146 | 12/1975 | Russell . |
| 4,880,511 | 11/1989 | Sugita . |
| 4,944,882 | 2/1990 | Ray et al. ........................... 210/644 X |
| 4,981,594 | 1/1991 | Jones ....................................... 210/634 |
| 4,992,179 | 2/1991 | Brierley et al. . |
| 5,182,165 | 1/1993 | Clough et al. . |
| 5,266,203 | 11/1993 | Mukhopadhyay et al. . |
| 5,279,745 | 1/1994 | Jeffers et al. . |
| 5,310,486 | 5/1994 | Green et al. ......................... 210/651 X |
| 5,372,701 | 12/1994 | Gerdon et al. . |
| 5,403,490 | 4/1995 | Desai . |

OTHER PUBLICATIONS

Arbiter, N. et al., "Copper hydrometallurgy–evolution and milestones", *Mining Engineering*, Feb. 1994 (pp. 118–123).

*Primary Examiner*—Frank Spear
*Attorney, Agent, or Firm*—Jay K. Malkin; Klaas, Law, O'Meara & Malkin

[57] ABSTRACT

A treatment system for removing metal ions from liquids. A metal ion-containing liquid (e.g. water or an acidic mining leachate) is first passed through a nanofiltration membrane system to produce a metal ion-rich retentate and a permeate. The retentate may be saved for metal recovery or discarded. To purify the permeate and remove residual metal ions therefrom, it may thereafter be passed through one or more columns containing metal ion-extracting materials. Specifically, the permeate is passed through at least one and preferably multiple columns filled with porous polymer beads having metal ion extracting agents therein (e.g. biomass materials). As a result, purified liquid is produced. When saturated with metal ions, each bead-containing column is successively cleaned with acid solutions.

14 Claims, 8 Drawing Sheets

LIQUID TREATMENT SYSTEM AND METHOD FOR OPERATING THE SAME

This application is a continuation-in-part of U.S. patent application Ser. No. 08/067,055 filed May 25, 1993, now U.S. Pat. No. 5,310,486.

BACKGROUND OF THE INVENTION

The present invention generally relates to liquid treatment systems, and more particularly to the use and operation of a liquid treatment system designed to effectively remove dissolved metals from liquid compositions.

Industrial, mining, agricultural, and various natural processes often produce considerable amounts of waste water. This water is frequently contaminated with a variety of undesirable materials ranging from organic solvents to heavy metal ions. The removal of dissolved metals (e.g. metal ions) from water is of particular importance, especially with respect to ions of the following metals: group II(A) metals, transition metals (e.g. including but not limited to nickel, copper, cobalt, zinc, cadmium, iron, manganese, chromium, and silver), group III(A) metals (e.g. thallium), group IV(A) metals (e.g. lead), as well as various metalloids/semimetals within groups V(A) and VI(A) including but not limited to arsenic and selenium. These materials may present considerable environmental and toxicity problems. Thus, it is important that they be removed from waste water in an efficient manner and disposed of properly.

In addition, as described in greater detail below, many mining processes including but not limited to procedures associated with copper production involve materials known as "lixivants" which are used to leach metals (e.g. copper ions) from ore. Exemplary lixivants suitable for use in copper production preferably include a strong acid therein (e.g. $H_2SO_4$). As the lixivant solution passes downwardly through a heap or pile of copper ore, a liquid product is produced which contains remaining amounts of acid in combination with copper ions. These copper ions must then be removed from the liquid product to produce a copper ion concentrate. The copper ion concentrate is subsequently treated using a selected process (including but not limited to solvent extraction/electrowinning ("SX/EW") as described in greater detail below) to obtain metallic copper. It is therefore important to remove metal ions from the liquid product in the most complete and effective manner possible so that economic benefits of the entire mining process may be maximized.

Many chemical and physical techniques have been developed for removing dissolved metals (e.g. metal ions) from liquids. For example, as described in Ying, Wei-Chi, et. al., "Precipitation Treatment of Spent Electroless Nickel Plating Baths", *Journal of Hazardous Materials*, 18:69–89 (1988), one procedure involves the precipitation of metal ions with caustic soda or lime. In the alternative, one recently-developed, highly efficient technique involves the use of polymer materials (preferably in the form of beads or other small units) having metal ion extracting agents therein. These materials are described in U.S. Pat. No. 5,279,745 to Jeffers et al. which is incorporated herein by reference. They specifically involve polymeric beads made of polysulfone, cellulose acetate, or other organic polymers having various metal ion extracting agents therein. Exemplary metal ion extracting agents include but are not limited to selected biomass materials (e.g. peat moss, yeast, algae, molds, xanthan gum, guar gum, alginates, and mixtures thereof). Other extracting agents include but are not limited to tri-isooctyl amine, di-2-ethylhexyl phosphoric acid, tri-octyl methylammonium chloride, 2-hydroxy-5-dodecyl-benzophenone oxime, and di-2-4,4-trimethylpentyl phosphinic acid.

Exemplary bead materials are prepared by first dissolving high-density polysulfone in an organic solvent known in the art (e.g. dimethylformamide [DMF]). Next, the desired biomass materials or chemical extractants are mixed with the polysulfone-DMF mixture. To facilitate this procedure, the biomass/extractants may first be adsorbed onto activated carbon.

After this step, inert metal powders (e.g. magnetite) may be combined with the mixture to increase bead density and/or impart magnetic properties to the beads. Finally, the mixture is injected through a nozzle into water, whereby porous, spherical beads preferably ranging in size from about 1/64 to 1/4 inches in diameter are immediately produced. The beads have a relatively intricate internal pore structure, with the biomass/extractants being immobilized/entrained therein. It is preferred that the beads be fabricated from mixtures containing about 75–200 g of polysulfone per liter of solvent. It is also preferred that polar solvents be used to produce the beads, and other representative solvents which may be used include but are not limited to dimethyl sulfoxide, tetrahydrofuran, acetone, and mixtures thereof. Other biomass materials of interest include penicillium mold and common duckweed (Lemna sp.)

The polymeric units e.g. beads) described herein are highly efficient in removing dissolved metals (e.g. metal ions) from liquids. Specifically, dissolved metals in the selected liquids flow into the internal pore structures of the polymeric units where they are retained therein by the biomass materials/chemical extractants. However, in order to efficiently use the polymeric units for large scale treatment purposes, they must be periodically "regenerated". Regeneration (e.g. cleaning) involves the removal of collected metals from the polymeric units so that they may be reused.

The present invention specifically provides an improved method for liquid treatment in which a rapid and efficient procedure is disclosed for removing metal ions from liquid materials. Accordingly, the invention represents an advance in the art of liquid treatment technology, as described in detail herein.

SUMMARY OF THE INVENTION

It is an object of the present invention to provide an efficient liquid treatment process for water and other liquid compositions.

It is another object of the invention to provide a water treatment process which is especially useful in removing dissolved metals (e.g. metal ions) from waste water.

It is another object of the invention to provide a process for removing dissolved metals from waste water which uses porous polymeric units (e.g. beads) having metal ion extracting agents therein.

It is a further object of the invention to provide a process for removing dissolved metals from waste water using porous polymeric units having metal ion extracting agents therein which are rapidly and efficiently regenerated after saturation with metal ions.

It is a still further object of the invention to provide a process for removing dissolved metals from waste water using porous polymeric units having metal ion extracting agents therein in combination with a specialized, highly efficient metal ion filtration system which dramatically improves the efficiency of the entire process.

It is a still further object of the invention to provide a process for removing metal ions from mining lixivants associated with the leaching of ore compositions so that a metal ion concentrate may be produced.

It is an even further object of the invention to provide a process for removing copper ions from acidic mining lixivants used in connection with the heap, vat, or in-situ leaching of copper ore so that a metal ion concentrate may be produced.

In accordance with the foregoing objects, an efficient treatment process for removing dissolved metals (e.g. metal ions) from waste water is disclosed. Specifically, waste water containing ions of a variety of dissolved metals (e.g. group II(A) metals, transition metals including but not limited to nickel, copper, cobalt, zinc, cadmium, iron, manganese, chromium and silver, group III(A) metals (e.g. thallium), group IV(A) metals (e.g. lead), as well as metalloids/semimetals within groups V(A) and VI(A) including but not limited to arsenic and selenium) is first passed through at least one nanofiltration membrane filter unit. In order to remove the foregoing dissolved metals from the waste water, a plurality of nanofiltration membrane filter units are used in series and/or in parallel with each other as described below. Nanofiltration membrane systems are highly unique, and enable the efficient removal of dissolved metals (e.g. ionic metal species) from liquid waste streams. They were first developed in the late 1980s and are unique in structure and function. While most commercially available nanofiltration membranes are proprietary in nature, they all have various common characteristics as described in Lein, L., "Nanofiltration: Trend of the Future?", *water Conditioning & Purification*, pp. 24–27 (September 1992). Basically, nanofiltration membranes are capable of preventing the passage therethrough of, for example, sulfates and calcium while substantially allowing the passage of chlorides and sodium. As a result, nanofiltration membranes are particularly useful in the production of "soft" water. Furthermore, as described in the April 1991 Application Bulletin entitled "Desal-5 107" from Desalination Systems, Inc. of Escondido, Calif. which is a major producer of nanofiltration membranes, nanofiltration basically falls within the overlap region between ultrafiltration and reverse osmosis. This would typically involve an approximate molecular weight cut-off of about 200–300 for non-charged organic molecules. While further functional aspects of nanofiltration membranes are not yet entirely understood, is clear that they are efficient in preventing the foregoing metal ions from passing therethrough as explained in greater detail below.

The introduction of contaminated water into the foregoing nanofiltration membrane system produces a concentrated metal ion-rich retentate which is prevented from passing through the membrane system and a permeate which readily passes therethrough. The concentrated retentate is removed from the system for storage and/or disposal while the permeate (which has relatively low amounts of residual dissolved metals therein) is directed into a first treatment column for the removal of any additional/residual dissolved metals (e.g. metal ions) not removed by the nanofiltration system. The first column has a plurality of porous units therein preferably in the form of beads (e.g. spherical or non-spherical) manufactured of polymeric materials in combination with one or more metal ion extracting agents which are entrained therein. Residual metal ions within the water are retained within the beads. After passage through the first column, the water is then directed into a second bead-containing column in order to remove any remaining residual metal ions not removed by the first column. The resulting highly-purified water is then collected. This water is suitable for discharge into the environment in compliance with applicable state and federal clean water regulations. At this point, it should be noted that the present invention shall not be limited exclusively to any particular number of bead-containing columns. While a three column system is described herein, any number of columns (e.g. one or more) may be used, depending on the type and quantity of the waste water being treated, as well as the degree to which such water is contaminated. The number of columns to be used (as well as other parameters described below) may be suitably varied within the scope of the invention as determined by preliminary pilot studies and tests on the specific waste water to be treated.

In an alternative embodiment of considerable industrial value, an acidic lixivant composition used in the leaching of metal ores may be treated in accordance with the invention to recover leached metal ions therefrom. Of specific interest is the heap leaching of copper-containing ore with an acidic lixivant containing $H_2SO_4$. Heap leaching basically involves the preparation of a heap or pile of rocks comprised of copper ore. The ore will primarily consist of copper oxides, although copper sulfides may also be present. To remove copper from the ore, the lixivant is applied to the pile and allowed to pass downwardly therethrough. As this process occurs, copper is leached from the ore to produce a liquid product containing remaining, excess amounts of $H_2SO_4$ in combination with dissolved copper (e.g. copper ions). The pH of the liquid product will normally be very acidic due to the presence of $H_2SO_4$ therein, and will typically fall within a range of about 1.5–3.0. A comparable liquid product having the foregoing characteristics may also be obtained from: (1) vat leaching of copper ore in which ore in rock or powder rock is leached in an enclosed vat/chamber; (2) in-situ leaching processes wherein the lixivant is placed in a pit formed within an ore-containing rock deposit or within a tunnel through a solid portion of ore; or (3) agitation leaching in which the selected lixivant is combined with finely-divided rock materials (e.g. flotation tailings) within a chamber or vat. The present invention shall likewise be applicable to all of these alterative copper leaching methods as discussed in greater detail below.

The liquid product generated from the above-listed leaching methods is thereafter delivered to (e.g. passed through) at least one nanofiltration membrane of the type and character described above. A preferred flow rate regarding passage of the liquid product into and through the nanofiltration membrane system in the present embodiment is between about 100–5000 GPM (gallons per minute), depending on the size and capacity of the nanofiltration system being used and other factors. However, the present invention shall not be limited to the foregoing range which is provided for example purposes only. Delivery of the liquid product into the selected nanofiltration membrane generates a retentate which does not pass through the membrane and a permeate which passes through the membrane. The retentate consists of a metal ion concentrate containing copper ions therein. This concentrate may then be treated using a number of techniques (including but not limited to solvent extraction/electrowinning ["SX/EW"]) so that high yields of metallic copper may be produced.

It is important to note that the pH of the liquid product prior to nanofiltration should be less than about 3.5. This pH factor is of considerable importance in that it enables nanofiltration to proceed in a rapid and effective manner. As described in greater detail below, the foregoing liquid product may include substantial amounts of dissolved iron (e.g.

iron ions) therein. These iron ions are often derived from the ore materials being treated. Also, when ore materials are treated which include large amounts of copper sulfides therein (as opposed to copper oxides), iron-containing additives (e.g. $Fe_2(SO_4)_3$) are added to the lixivant. Further information regarding the use of iron-containing additives will be described below. When iron-containing additives are used, dissolved iron levels in the liquid product are increased. The maintenance of a liquid product pH level of less than about 3.5 will prevent the formation of extraneous and undesired iron precipitates (e.g. iron sulfates) which typically result at higher pH values.

The formation of solid iron precipitates is highly undesirable during nanofiltration. Such precipitates can dramatically foul (e.g. clog) the nanofiltration membranes, thereby requiring a substantial amount of system down-time. As a result, the operating efficiency of the entire treatment system is reduced. By maintaining the liquid product at a pH of less than about 3.5, iron precipitates will not form and the foregoing problems will not occur. As noted above, the pH of the liquid product is normally below 3.5 due to the presence of $H_2SO_4$ therein. However, if the pH is above this level, an alterative embodiment of the invention involves the use of an additional supply of acid (e.g. $H_2SO_4$) which is combined with the liquid product prior to nanofiltration in an amount sufficient to reduce the pH level to less than about 3.5. The amount of additional acid to be used will depend on numerous factors including the chemical character of the liquid product, the amount of liquid product to the filtered, the dissolved iron content of the liquid product, and other factors. Preliminary pilot tests using established pH measurement/adjustment techniques may be used in connection with the liquid materials of interest to determine the need for acid addition, as well as the amount of acid to be added.

It should also be noted that at least one antiscalant composition may optionally be added to the liquid product prior to nanofiltration. Use of an antiscalant composition is preferred when the liquid product contains substantial amounts of dissolved calcium (e.g. calcium ions). For example, the addition of an antiscalant composition is desirable when the liquid product contains more than about 0.5 g/l of calcium ions therein. Dissolved calcium within the liquid product may come from the ore materials being treated and/or may result from the use of "hard" water to initially prepare the lixivant. Use of at least one antiscalant composition (as described in greater detail below) will prevent the formation of calcium precipitates (e.g. $CaSO_4$) during nanofiltration. Such precipitates can clog (e.g. foul) the selected nanofiltration membranes, thereby reducing the operational efficiency of the entire processing system. The amount of antiscalant composition to be used will depend on numerous factors, including but not limited to the chemical character of the liquid product, the pH of the liquid product, the amount of dissolved calcium within the liquid product, and other extrinsic factors. In this regard, preliminary pilot tests on the liquid product of interest may be used to determine whether antiscalant compositions are appropriate, and how much of the selected antiscalant compositions should be used.

Upon completion of the nanofiltration process, the retentate (e.g. metal ion-rich concentrate) is removed from the nanofiltration system. The retentate is thereafter treated in a conventional manner using electrowinning processes and the like to obtain elemental copper. If purification of the permeate to remove residual metal ions is desired, purification may be accomplished using the bead materials described above and methods associated therewith. In particular, the permeate is passed through a supply of the foregoing polymer beads each comprising a metal ion extracting agent (e.g. biomass materials) therein. If the permeate is highly acidic (e.g. with a pH of less than about 3.5), a selected alkali composition is preferably added thereto prior to bead treatment in order to raise the pH to about 3.5 or greater. This process facilitates metal ion removal using the bead materials described above.

After a period of sustained use in connection with any of the foregoing treatment processes, the beads within the first column in the treatment system become saturated with metal ions and must be regenerated. To accomplish this, the flow of feed liquid through the first column is terminated and re-routed directly into the second column. Liquid passing through the second column is then passed through a third bead-containing column which had been previously regenerated in accordance with the inventive processes described herein. In a preferred embodiment, the third column is connected to the system prior to termination of the feed liquid flow through the first column. Thereafter, the first column is preferably drained, followed by the passage of a primary acid solution therethrough from a first acid containment vessel. The primary acid solution removes most of the bound metal materials from the beads in the first column. Next, a secondary acid solution from a separately-maintained second acid containment vessel is passed through the first column at least once. The secondary acid solution removes any metal ions which were not removed by the primary acid solution.

It should be emphasized that the system of the present invention is designed to be continuous. Specifically, multiple columns will be treated using the primary acid solution and the secondary acid solution following treatment of the first column. At a specified point during the column treatment process, the primary acid solution becomes saturated with dissolved metals (e.g. metal ions) and is routed into a storage container. When this occurs, the secondary acid solution is routed from the column currently being treated into the first acid containment vessel. From a functional standpoint, the secondary acid solution (which is only minimally contaminated with metal ions) then operates in the same manner as the primary acid solution. After the primary acid solution is routed into the storage container, it may then, if desired, be treated in order to remove metal ions therefrom. Treatment is preferably accomplished by passage of the primary acid solution through at least one semi-permeable membrane which only allows the passage of primary acid solution therethrough and retains the metal ions. As a result, the membrane permeate consists of substantially purified primary acid solution which is subsequently routed back into the column regeneration system for use as the secondary acid solution. In a preferred embodiment, the purified primary acid solution is first routed into the second acid containment vessel, followed by the passage thereof through subsequent columns in the regeneration process. Accordingly, the circulation/regeneration of acid is repeated continuously throughout the liquid purification process, and minimizes the use of acid materials in the present invention.

After passage of the secondary acid solution through the first column, a supply of rinse water is preferably passed through the first column. Next, an alkali solution from an alkali storage container is passed through the first column in order to neutralize any acid materials remaining therein. Periodically during this process, the alkali solution is concentrated in order to remove excess water therefrom. In a preferred embodiment, concentration is accomplished by delivering the alkali solution to a semi-permeable membrane which only allows the passage of water therethrough and retains the ionic species used to initially form the alkali solution. As a result, excess water in the alkali solution is removed as it passes through the filter, with the retentate consisting of concentrated alkali solution. The concentrated alkali solution is then passed back into the alkali storage container for reuse. Finally, an additional supply of rinse water is passed through the first column to complete the cleaning/regeneration thereof.

The regenerated first column is then operatively connected to the third column in order to receive feed liquid therefrom. At this point in time, three columns are all operating (in series) in the liquid purification stage of the system. Shortly thereafter, the second column (which had been receiving liquid from the nanofiltration membrane units) is taken out of service and cleaned in the same manner described above with respect to the first column, leaving the third and first columns in position so that the purification process can continue. Thereafter, this cycle continues, with the three columns being successively cleaned and reintroduced into the system as described above. Using the procedure presented herein, the liquid purification process is allowed to continue with at least two columns being in operation at all times.

The present invention represents an extremely efficient process for removing dissolved metals from liquid materials in a simple and effective manner. These and other objects, features, and advantages of the invention will become apparent in the following Brief Description of the Drawings and Detailed Description of Preferred Embodiments.

BRIEF DESCRIPTION OF THE DRAWINGS

Illustrative and presently preferred embodiments of the invention are shown in the accompanying drawings in which.

DETAILED DESCRIPTION OF THE PREFERRED EMBODIMENTS

The present invention involves a highly efficient system for the removal of dissolved metals (e.g. metal ions) from liquid materials (e.g. water and other liquid compositions), and a method for cleaning the system continuously during the treatment process. The system basically involves three integrated stages, namely, (1) a nanofiltration stage; (2) a liquid purification stage preferably using bead materials having metal ion extracting agents therein, and (3) a cleaning/regeneration stage.

A. WASTE WATER TREATMENT

Figure 1:
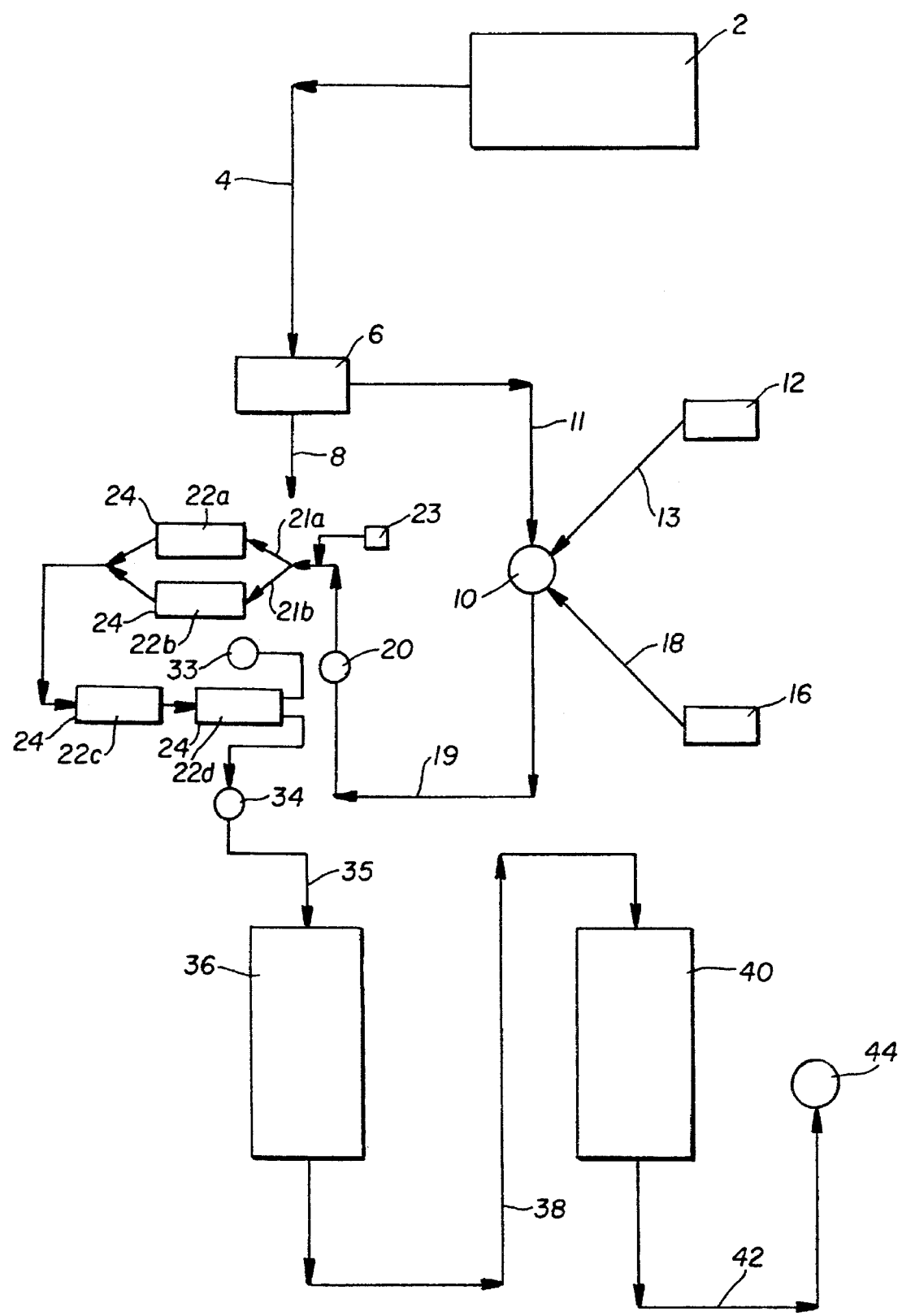
FIG. 1 is a partial schematic illustration showing how water is purified in accordance with the process of the present invention using a nanofiltration membrane system in combination with first and second purification columns operating in series.

With reference to FIG. 1, the nanofiltration and liquid purification stages are schematically illustrated. The lines and conduits to be used in the entire system preferably consist of 0.5–12 inch diameter PVC conduits manufactured by Spear Manufacturing Co. of Sylmar, Calif. or similar conduits made of metal (e.g. stainless steel). Likewise, valves used in the system may consist of standard PVC motorized ball valves manufactured by Hayward Industrial Products, Inc. of Elizabeth, N.J. or other comparable valves known in the art. However, it should be noted that specific structural components (e.g. valves, lines, and the like) used to implement the processes characterized herein may be suitably varied depending on the desired size and pressure requirements of the system, and the present invention shall not be exclusively limited to the illustrated embodiment and listed components. Furthermore, the recitation of specific part numbers and component suppliers as described herein are for example purposes only, and shall not limit the scope of the invention in any manner.

As shown in the embodiment of FIG. 1 which involves the treatment of water, feed water contaminated with dissolved metals is directed from a supply 2 into the system. The term "dissolved metals" as used herein shall generally signify ionic species of a variety of metals listed in the periodic table of elements including (1) group II(A) metals; (2) transition metals including but not limited to nickel, copper, cobalt, zinc, cadmium, iron, manganese, chromium and silver as well as other transition metals within groups III(B), IV(B), V(B), VI(B), VII(B), VIII(B), I(B), and II(B); (3) group III(A) metals (e.g. thallium and aluminum); (4) group IV(A) metals (e.g. tin and lead); and (5) metalloids/semimetals within groups V(A) and VI(A) including but not limited to arsenic and selenium. However, it should be noted that the methods set forth herein may also be applicable to other metals including but not limited to those in group V(A), group VI(A), the lanthanide series, and the actinide series. Furthermore, the term "metal ions" as used herein shall encompass the dissolved ionic species of the metals and metalloids/semimetals listed above.

The supply 2 of feed water may be obtained from mining operations, manufacturing facilities, or natural processes which generate considerable amounts of dissolved metal by-products. In the present embodiment, the preferred input flow rate of the feed water will be about 250–350 GPM (gallons per minute), with about 300 GPM being optimum.

Next, the feed water may pass via line 4 into an optional solids filter 6 which is used to remove extraneous particulate matter from the water. In a preferred embodiment, the filter 6 consists of a backwashable sand bed filter known in the art or other conventional system of comparable design (e.g. a standard, commercially-available bag filter). Solid materials trapped by the filter 6 are routed out of the system for disposal through line 8.

After passage through the optional filter 6, the feed water may then pass through an optional pH adjustment zone 10 via line 11 as illustrated in FIG. 1. Tests have shown that metal ion removal from the feed water is maximized when the pH thereof is maintained within a specific range which ultimately depends on the extent to which the waste water from the supply 2 is contaminated and what type of contaminants are present. For most purposes (except as otherwise indicated below in the embodiment associated with FIG. 8), this pH range is between about 3.5– 7.5. To lower the pH of the feed water, an aqueous acid solution from a source 12 is routed into zone 10 via line 13 where it is mixed with the feed water and then conventionally tested to determine if the desired pH level has been achieved. Exemplary acids for this purpose include but are not limited to sulfuric acid, nitric acid, hydrochloric acid, perchloric acid, and phosphoric acid with sulfuric acid being preferred as described below. In the alternative, the pH of the feed water may be raised through the addition of an aqueous alkali solution from a source 16 which is routed into zone 10 via line 18. Exemplary alkali compositions for this purpose include but are not limited to sodium hydroxide, sodium bicarbonate, and ammonia. After alkali addition, the feed water is again tested in a conventional manner to determine if the desired pH level has been achieved.

Thereafter, the feed water is passed via line 19 through at least one pump 20 (e.g. of a conventional centrifugal or positive displacement variety) into at least one and preferably multiple nanofiltration membrane units 22 (e.g. 22a–22d). As illustrated in FIG. 1, the feed water is divided into dual streams 21a and 21b, with stream 21a entering nanofiltration membrane unit 22a and stream 21b entering nanofiltration membrane unit 22b. Thus, at this point, the nanofiltration membrane units 22a, 22b are operating in parallel with each other. Thereafter, the water converges and enters nanofiltration membrane units 22c–22d which are arranged in series. It should be noted that the present invention shall not be limited to any specific arrangement of nanofiltration membrane units 22. They may be arranged in series, in parallel, or in a combination of both. The ultimate arrangement of nanofiltration membrane units 22 will depend on a variety of factors including but not limited to waste water concentration, the size of the membrane units 22, and the incoming flow rate. For example, in applications involving waste water having a relatively high incoming flow rate (e.g. exceeding about 50 GPM), the water is preferably divided into a plurality of streams 21a and 21b as noted above, which are processed using a system wherein the initial nanofiltration membrane units 22a, 22b are arranged in parallel with the remaining units 22c–22d being arranged in series as shown in FIG. 1. This technique enables relatively large initial feed streams to be handled and treated in a more rapid and efficient manner without overloading the system. In addition, the ultimate number of nanofiltration membrane units 22 will likewise vary, depending on the amount of waste water to be treated, the metal ion concentration of the water, and the initial flow rate. Thus, the present invention shall not be limited to any particular arrangement or number of individual nanofiltration membrane units 22.

As described above, nanofiltration is a unique concept which was first recognized and developed in the late 1980s. While most commercially-available nanofiltration membranes are proprietary in nature, they all have various specific characteristics as described in Lein, L., "Nanofiltration: Trend of the Future?", *Water Conditioning & Purification*, pp. 24–27 (September 1992), supra. Basically, nanofiltration membranes are capable of preventing the passage therethrough of sulfates and calcium while allowing the passage of chlorides and sodium. As previously noted, nanofiltration membranes are particularly useful in the production of "soft" water. Furthermore, as described in the April 1991 Application Bulletin entitled "Desal-5 107" from Desalination Systems, Inc. of Escondido, Calif. which is a major producer of nanofiltration membranes, nanofiltration basically falls within the overlap region between ultrafiltration and reverse osmosis. Specifically, nanofiltration membranes will typically prevent the passage therethrough of uncharged organic molecules having a molecular weight which exceeds about 200– 300, depending on the exact chemical and charge characteristics of such molecules. In contrast, ultrafiltration membranes will typically prevent the passage therethrough of uncharged organic molecules having a molecular weight which exceeds about 1000–100,000, again depending on the chemical and charge characteristics of such materials. Thus, nanofiltration membranes can restrict the passage of materials which would normally pass through ultrafiltration membranes. Most commercially available nanofiltration membranes also have a very high membrane flux which enables them to operate at relatively low fluid pressures (e.g. 75–200 psi).

Nanofiltration membranes are efficient in preventing the passage therethrough of the dissolved metals (e.g. metal ions) listed above. In the present embodiment, this efficiency may be facilitated and enhanced through the presence of sulfate anions in the feed water containing the metal ions. Such sulfate anions are normally present in most feed water streams from the above-described sources (e.g. from industrial, mining, and agricultural processes). However, under certain circumstances, sulfate materials may be added if necessary (e.g. depending on the character of the initial waste water). The addition of sulfate anions is readily accomplished through the use of sulfuric acid from source 12 in the pH adjustment step described above. Thus, for pH adjustment purposes, the use of sulfuric acid is preferred. In the alternative, other sulfate materials known in the art for this purpose may be added from an optional auxiliary source 23. In a preferred embodiment, if sulfate anion enhancement is undertaken, the feed water stream will preferably be augmented so that an approximate 1:1 relationship exists between metal ions and sulfate anions (e.g. one sulfate anion for each metal ion). However, it is important to note that the presence of sulfate anions is not essential in order to enable the filtration of metal ions by nanofiltration membrane units 22. Instead, under certain circumstances as determined by preliminary pilot studies, sulfate addition may be useful.

Figure 2:
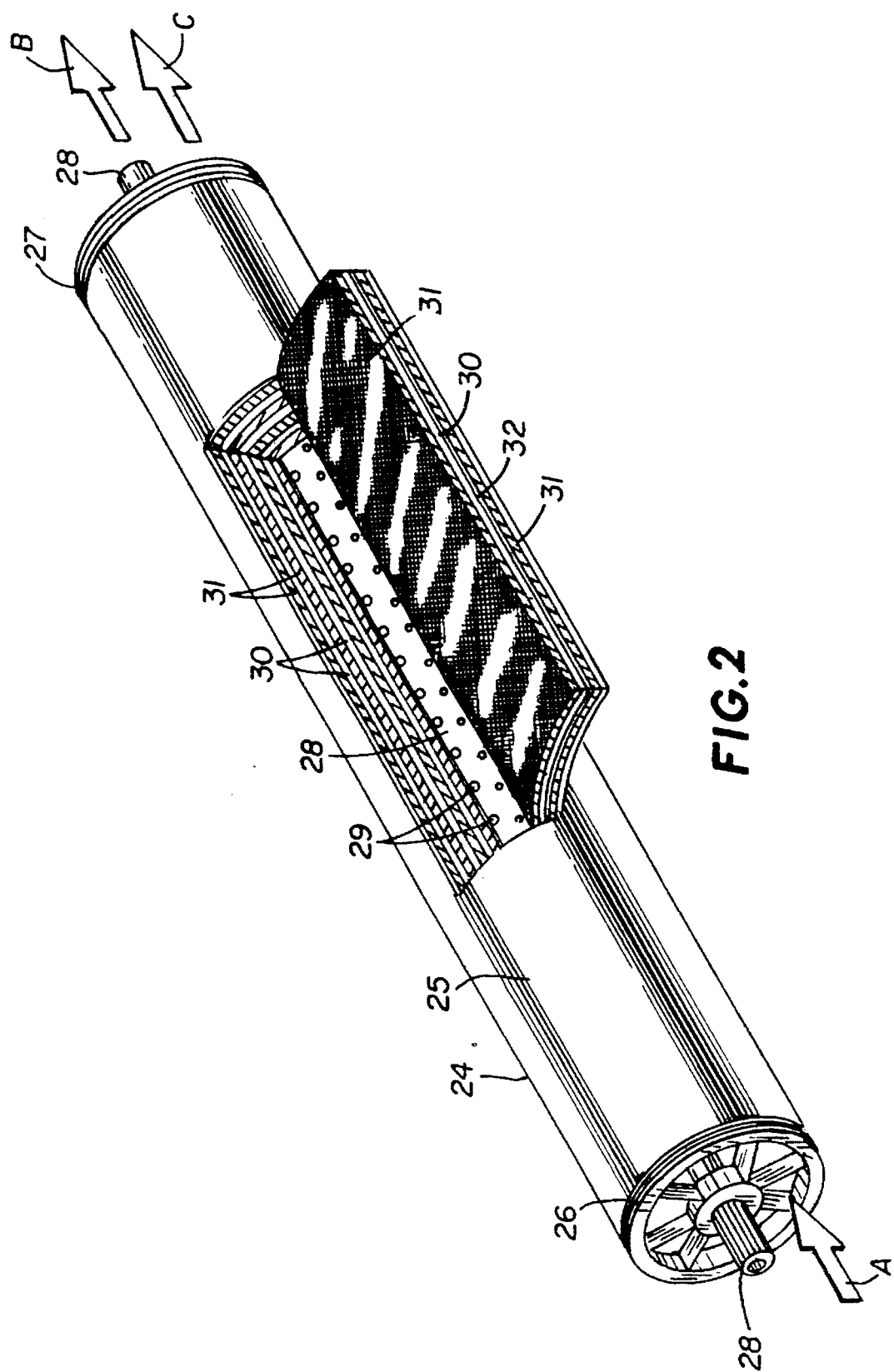
FIG. 2 is a schematic, front perspective view of a typical nanofiltration membrane cartridge which may be used effectively in the processes illustrated in FIGS. 1 and 8 wherein portions of the cartridge are broken away to show the interior thereof.

An exemplary commercial nanofiltration membrane unit 22 suitable for use in the present invention is produced by Desalination Systems, Inc. of Escondido, Calif. under the name "Desal-5". This membrane unit 22 is typically in the form of an elongate cartridge 24 which is illustrated in FIGS. 1–2. Each cartridge 24 is typically about 40 inches long and preferably between about 4–8 inches in diameter. The cartridge 24 includes a housing 25 having a first end 26 and a second end 27. The first end 26 and the second end 27 are both open so that fluids may pass through the housing 25. In the center of the cartridge 24 is an elongate conduit 28 having numerous openings 29 therethrough. Surrounding the conduit 28 are multiple spirally-wound layers 30 of filter membrane material which is proprietary in structure and chemical composition. Also associated with the layers 30 of filter membrane material are associated layers 31 of a porous spacer material (e.g. a proprietary plastic/polymer mesh) and layers 32 of a porous membrane backing material (e.g. also manufactured of a proprietary porous plastic material) to which the layers 30 of filter membrane material are affixed. In use, the fluid to be treated enters the first end 26 of the cartridge 24 in the direction of arrow "A". Such fluid is not allowed to enter the elongate conduit 28 which is designed to receive filtered permeate as described below. As a result, the incoming fluid passes between and through the layers 30 of filter membrane material. In the case of incoming fluids with dissolved metal contaminants therein, a metal ion-rich retentate is formed between the layers 30 of filter membrane material. In contrast, liquid passing through the layers 30 of membrane material, layers 31 of spacer material, and layers 32 of backing material constitutes purified permeate. The permeate ultimately enters the conduit 28 via the openings 29 therethrough. It should be noted that the permeate flows inwardly toward the conduit 28 in a direction perpendicular to the direction of arrow "A" due to the relatively high pressure at which fluid materials enter each cartridge 24 compared with the relatively slow rate at which the fluids are able to travel through the densely-compacted layers 30, 31, 32 of material in the cartridge 24. As a result, the permeate (which has a significantly lower concentration of dissolved metals therein compared with the initial waste water) is allowed to leave the conduit 28 at the second end 27 of the cartridge 24 in the direction of arrow "B". The metal ion-rich retentate flows along and between the layers 30 of filter membrane material and ultimately leaves the cartridge 24 at the second end 27 thereof in the direction of arrow "C". The flow of retentate in this manner is facilitated by continuous fluid pressure exerted on the system by incoming fluid materials.

As stated above, the cartridge 24 illustrated in FIG. 2 is commercially available from Desalination Systems, Inc. of Escondido, Calif. under the name "Desal-5". However, other commercially-available nanofiltration systems may be used in connection with the present invention. Thus, the invention shall be not limited exclusively to the cartridge 24 illustrated in FIG. 2. Furthermore, the number of cartridges 24 may be selectively varied, depending on the type and amount of incoming fluid to be treated. For example, if 15 gallons of waste water are to be treated at a flow rate of about 40 GPM having about 500 mg/ml of total metal ions therein, optimum results will be achieved if twelve cartridges 24 are used in series, with each cartridge 24 being about 40 inches long and about 4.0 inches in diameter.

The metal ion-rich retentate from all of the combined cartridges 24 (designated at reference number 33 in FIG. 1) is then collected and suitably disposed of or treated using conventional means (e.g. chemical precipitation as described above). The permeate (designated at reference number 34 in FIG. 1) is then routed via line 35 into at least one column (e.g. column 36) packed with polymeric units having metal ion extracting agents therein. Use of the nanofiltration membrane units 22 (e.g. the cartridges 24) as described herein can result in the removal of approximately 50–99% by weight of the total dissolved metal contaminants present in the initial waste water materials. Remaining or residual (e.g. additional) dissolved metals (e.g. metal ions) may then be removed using the first column 36 and subsequent portions of the entire system as described below. The above-described polymeric units are preferably in the form of individual beads (either spherical or non-spherical). The physical and structural characteristics of the beads are described above and in U.S. Pat. No. 5,279,745 to Jeffers et al. which is incorporated herein by reference. However, the present invention shall not be limited to the use of bead materials or the specific compositions listed in the foregoing documents. Polymeric units of different materials and varying external configurations (e.g. non-spherical) may also be used. Also, the first column 36 (and the other columns described below) may alternatively be provided with a supply of a conventional ion exchange resin therein which is known in the art and suitable for the removal of metal ions from contaminated water. Ion exchange resins basically involve organic or inorganic polymer resins having ionic groups thereon which may be reversibly replaced with other, commonly charged ions (e.g. the above-listed metal ions) in a solution to be treated. Thus, by placing a solution having metal ions therein in contact with a suitable ion exchange resin (e.g. retained within one or more columns), metal ions from the solution will become molecularly bound to the resin as part of the ion exchange process which is a known chemical phenomenon. Exemplary ion exchange resins suitable for this purpose include but are not limited to a product sold under the name AMBERLITE™ IRC-718 sold by Rohm and Haas of Philadelphia, Pa. This material specifically consists of a styrene divinyl benzene matrix with iminodiacetic acid groups functionally bound thereto. An alternative ion exchange resin suitable for use herein consists of a product sold under the name DOWEX MARATHON C™ by the Dow Chemical Corporation of Midland, Mich. This material specifically involves a styrene divinyl benzene copolymer matrix with sulfonic acid functional groups thereon. Accordingly, a wide variety of other commercially-available ion exchange resins may be used for the purposes set forth herein, and the present invention shall not be limited exclusively to the examples listed above. These and any other applicable ion exchange resins are preferably used in the same quantity as the bead materials described herein. It should also be noted that ion exchange resins of the type set forth above may be regenerated (e.g. treated to remove collected metal ions therefrom) by contacting the resins with acid materials in substantially the same manner described below for regeneration of the bead materials.

While the foregoing ion exchange materials will effectively remove dissolved metals (e.g. metal ions) from contaminated waste water, the polymer beads containing metal ion extracting agents therein (e.g. biomass materials) function in a more efficient and economical manner, and are therefore preferred. Thus, from this point forward, the present invention shall be discussed with reference to bead materials as the primary liquid purification agents unless otherwise indicated.

With continued reference to FIG. 1., an exemplary column 36 would consist of a 4000 gallon vinyl ester resin-lined steel tank manufactured by Eaton Metal Products of Denver, Colo. This tank is equipped with a hub and lateral water distribution system produced by Mattson, Inc. of Barrington, Ill. It is approximately 8 feet in diameter and 9.8 feet long. Furthermore, it is preferably equipped with an air vent system manufactured by Taco, Inc. (Model No. 409) of Cranston, R.I.

The column 36 is filled with the beads in an amount less than the capacity of the column 36. For example, if the column 36 has a capacity of 4000 gallons, then approximately 3000 gallons of beads are preferably used. The beads as described herein are commercially available from Harrison Western Environmental Services, Inc. of Lakewood, Colo. (USA) under the product name "HW FIX BEADS". These beads are prepared from polysulfone materials in the manner set forth above, and have sphagnum peat moss entrained therein as the selected biomass material.

As the incoming water passes through the column 36, metal ions within the water are extracted and retained within the beads. Accordingly, the water passing out of the column 36 through line 38 will be nearly depleted of dissolved metals.

However, in order to remove any further residual metal ions which remain in the water after passage through the column 36, the water in a preferred embodiment is passed via line 38 into a second column 40. The second column 40 is filled with the metal ion-extracting beads described above, and is structurally/functionally identical with the first column 36. In a preferred embodiment wherein the first column 36 and the second column 40 each have a capacity of about 4000 gallons with about 3000 gallons of beads therein, the water passing through each column will have an average retention time of about 10 minutes, and a flow rate of about 6BV ("bed volumes")/hour.

The resulting product from the second column 40 consists of a supply of purified water which passes through line 42 and is collected in a storage vessel 44. This water is sufficiently clean for lawful discharge into the environment in compliance with applicable state and federal regulations. Specifically, the water will typically include less than about 1 ppm of total dissolved metals therein which is a substantially negligible quantity. At this point, the water purification process is completed.

It should be noted that, while a three column system is described herein for example purposes, any number of columns (e.g. one or more) may be used, depending on the type and quantity of the waste water being treated, as well as the degree to which such water is contaminated. The number of columns to be used (as well as other parameters described herein) may be suitably varied within the scope of the invention as determined by preliminary pilot studies and tests on the specific waste water to be treated.

Figure 3:
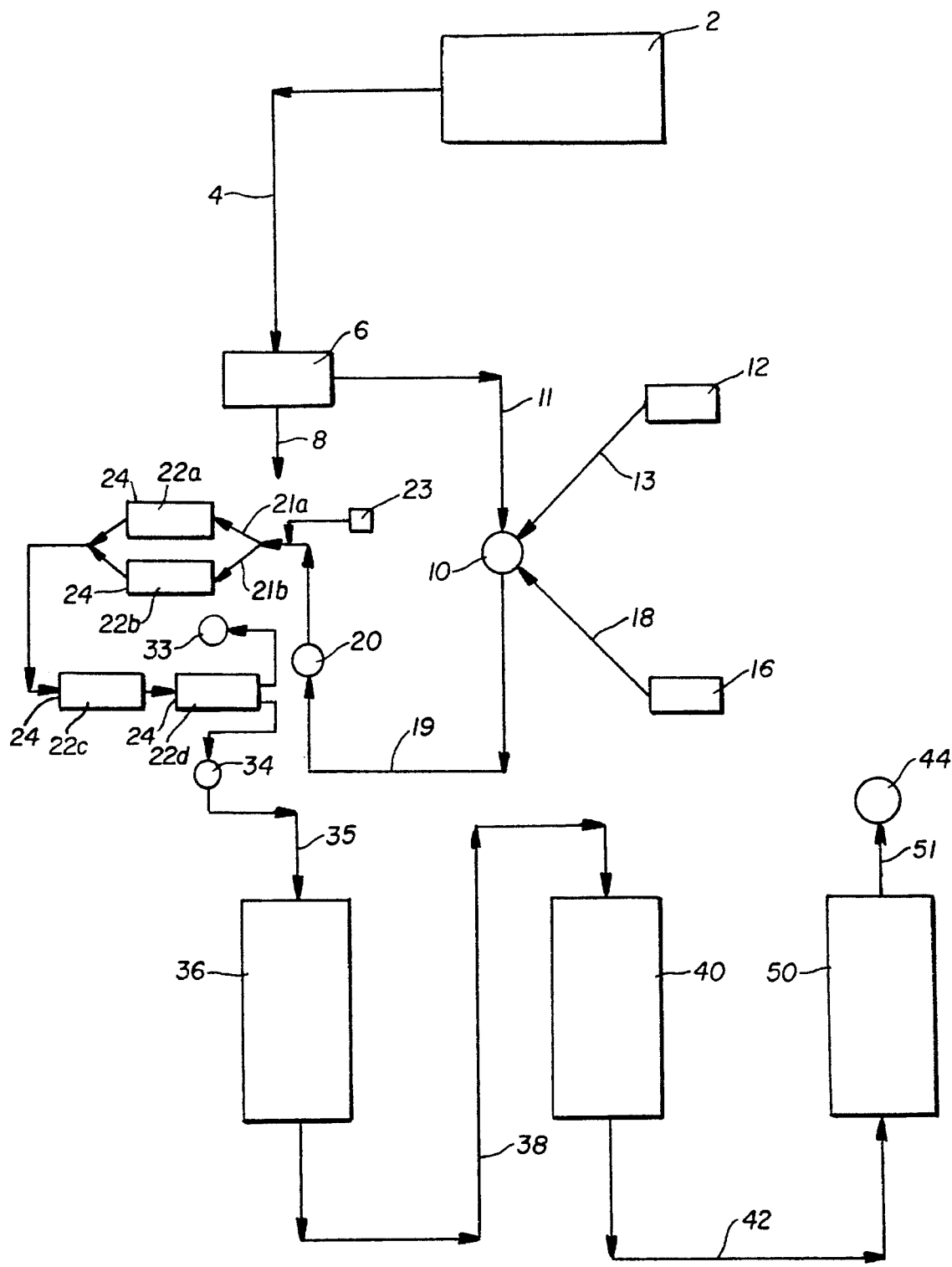
FIG. 3 is a partial schematic illustration of the process of FIG. 1 in which a third purification column is placed into service within the system prior to regeneration of the first purification column.
Figure 4:
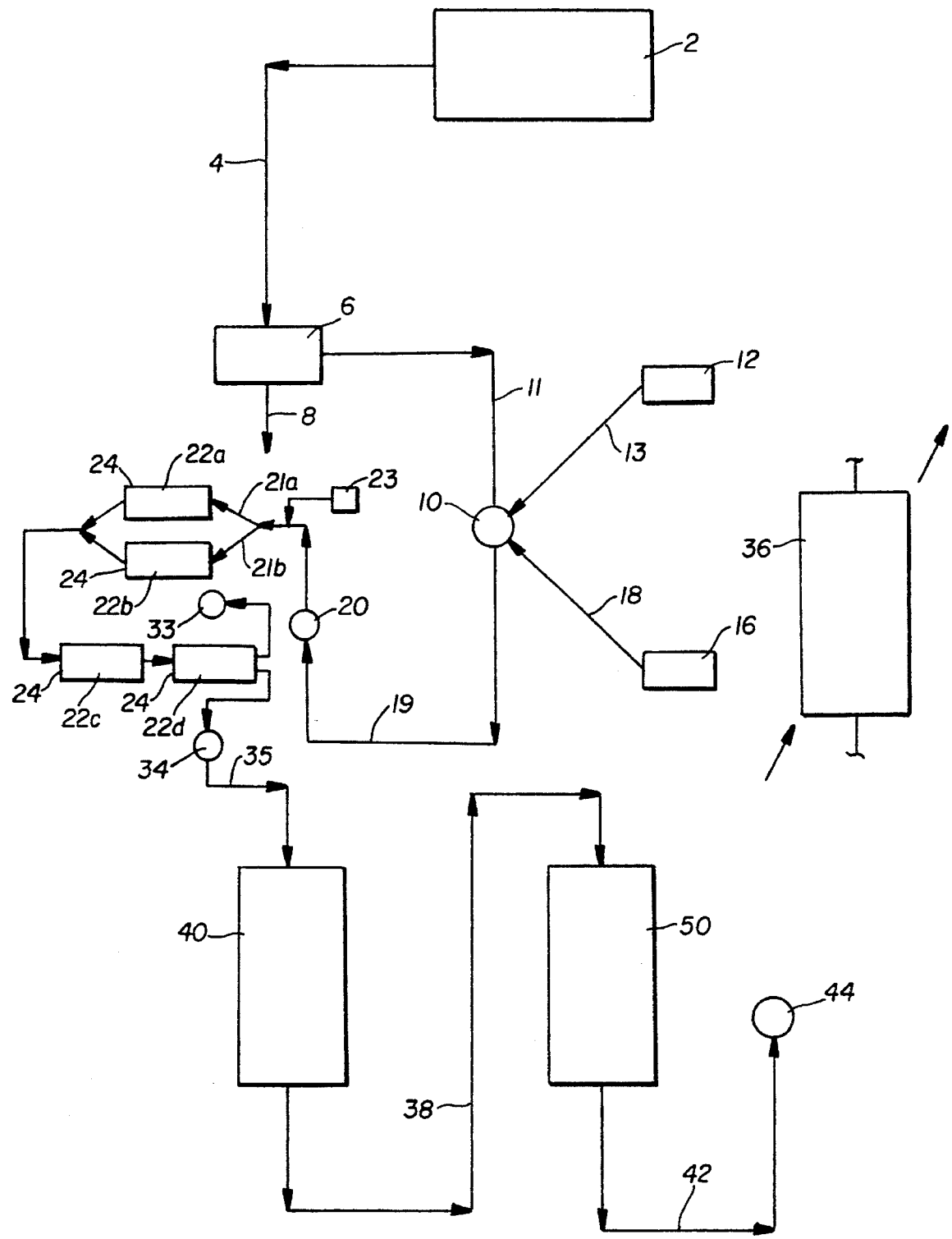
FIG. 4 is a partial schematic illustration of the process of FIG. 3 in which the first purification column in the system is taken out of service for the regeneration thereof.

The specific, exemplary water purification process described herein is designed to operate with three separate bead-filled columns. Specifically, at least two columns are used to purify water, while a third column is being cleaned (e.g. regenerated). When the first or lead column 36 in the water purification stage shown in FIG. 1 becomes saturated with metals (e.g. bound metal ions) it is then operatively connected to the cleaning stage of the system. However, before this occurs, a third, previously-cleaned column having the same structural/functional characteristics as the other columns is operatively connected to the second column in the system so that three columns are operating in series to purify water (FIG. 3). Shortly thereafter, the first column 36 is connected to the cleaning stage as described above, and the second column is advanced to the position of the first column 36 in order to receive water from the supply 2 and nanofiltration membrane units 22 as illustrated in FIG. 4 and described below. Thus, the present system operates in an efficient and continuous manner by "rotating" columns between purification and cleaning stages as described in greater detail below.

In the present embodiment, when the first column 36 becomes saturated with metal ions, it is disconnected (e.g. isolated) from line 35 in order to terminate the flow of incoming water through the first column 36 from the supply 2 and nanofiltration membrane units 22. Prior to isolation of the first column 36 from the flow of incoming water thereto, a third column 50 which is identical in structure, function, and purpose to the first and second columns 36, 40 is connected to the second column 40 via line 42 (FIG. 3). Water flowing through the third column 50 is then passed through line 51 into storage vessel 44. Shortly thereafter (when it is determined that the first column 36 is saturated with metal ions), the first column 36 is disconnected (e.g. isolated) from the system for regeneration as noted above and illustrated in FIG. 4. A determination as to when the first column 36 becomes saturated with metal ions is obtained as a result of pilot studies conducted on the system prior to full scale operation. More specifically, a preliminary test is conducted on the first column 36 in which the contaminated water of concern is passed through the column 36 and analyzed thereafter using conventional analytical equipment/techniques known in the art. When the dissolved metal content of the water remains substantially unchanged after passage through the column 36, the column 36 has become "saturated". The time it took for saturation to occur at a specified flow rate is then used during actual water purification to determine when column 36 (and subsequent "lead" columns) should be taken out of service. Comparable pilot studies must be made each time a different supply of contaminated water is treated, since column saturation time will vary, depending on numerous factors including the specific metals in the water, the ionic concentration of the water, the water flow rate, etc. In addition, the use of commercially-available ion-specific probes may also be used in an alternative embodiment to determine the metal ion content of fluid materials leaving the columns described herein. A high metal ion content with respect to liquids leaving the columns will indicate that column regeneration is necessary.

When the first column 36 is taken out of service, the second column 40 is operatively connected to the line 35 so that incoming water may pass therethrough (FIG. 4) from the supply 2 and nanofiltration membrane units 22. At this point, the system functions using two columns as illustrated in FIG. 4.

Figure 5:
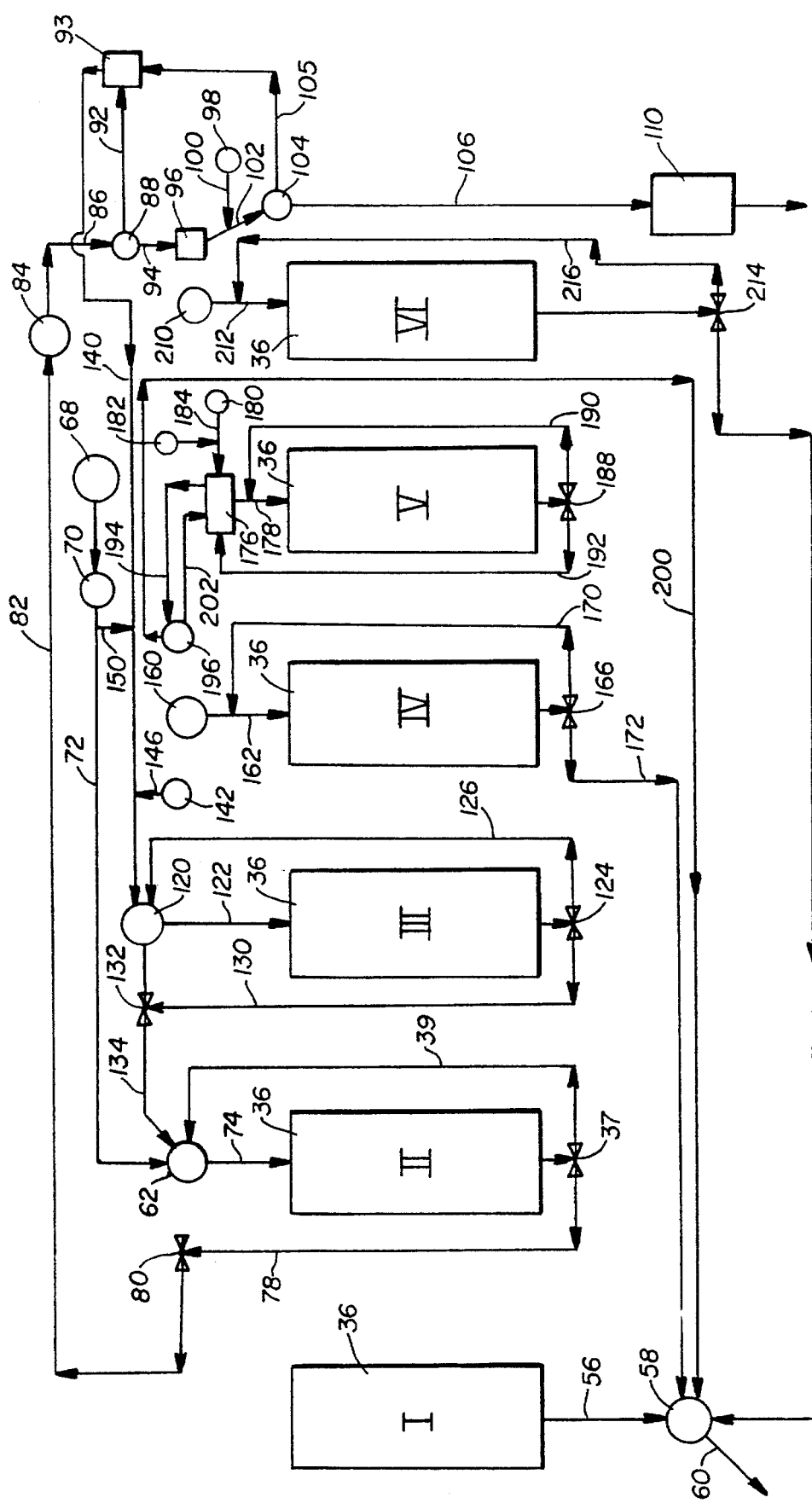
FIG. 5 is a partial schematic illustration showing regeneration of the first purification column.

The first column 36 is then operatively connected to the cleaning or regeneration stage of the system as schematically illustrated in FIG. 5. With reference to FIG. 5, the first column 36 enters Phase 1 of the regeneration process as specifically indicated in FIG. 5 by the roman numeral "I". Phase 1 (which is optional but preferred) involves operative connection of the column 36 to a drain line 56 which is connected to a remix tank 58 (preferably consisting of a 10,000 gallon steel vessel lined with vinyl ester resin and manufactured by Eaton Metal Products of Denver, Colo.). From the remix tank 58, the drainage from column 36 is routed via line 60 back into the supply 2 of feed water for subsequent re-purification.

Next, in Phase 2 ("II") of the regeneration process, the drained column 36 is connected to a first containment vessel 62 having a primary acid solution therein. The primary acid solution preferably consists of an aqueous solution of an acid selected from the group consisting of sulfuric acid, nitric acid, hydrochloric acid, perchloric acid, and phosphoric acid. In a preferred embodiment, the primary acid solution will have a concentration level of about 15 grams/liter–30 grams/liter. At this concentration level, the primary acid solution will be highly acidic with a pH of about 1.0 or less. A specific acid solution suitable for use with present invention consists of 70M sulfuric acid (about 30 grams/liter) which is supplied to the first containment vessel 62 from an acid storage tank 68 (330 gallon capacity manufactured by Industrial Chemicals Corp. of Arvada, Colo.). Primary acid solution from the acid storage tank 68 passes through a metering apparatus 70 known in the art and is then routed via line 72 into the first containment vessel 62. The primary acid solution subsequently passes from the first containment vessel 62 through line 74 into the column 36 at least once at a flow rate of about 250–350 GPM (300 GPM=preferred). The primary acid solution passing through the column 36 chemically strips bound metal ions from the beads in the column 36. If desired, the primary acid solution may be routed via valve 37 and line 39 back into the first containment vessel 62 where it is recirculated through the column 36 (via line 74) about 2–3 times. Thus, the primary acid solution from the first containment vessel 62 may preferably pass through the column 36 about 1–3 times, depending on the specific metal ions involved and other experimentally determined factors.

At a selected point during operation of the present system, the primary acid solution becomes saturated with dissolved metals (e.g. metal ions) and essentially becomes an acidic waste solution of little functional value. This normally occurs when the metal ion concentration of the primary acid solution reaches a constant level after repeated column treatment. Again, saturation of the primary acid solution may be determined by preliminary pilot tests of the same type as described above with respect to saturation of the first column 36. However, as a general rule, tests have determined that a saturation level is assumed to exist after the primary acid solution has been used to regenerate three separate bead-containing columns in the manner described above.

With continued reference to FIG. 5, if the primary acid solution has become saturated under the circumstances discussed herein, it is routed from the column 36 through valve 37 into line 78 at a flow rate substantially equal to initial flow rate of the feed water into the system from supply 2. The saturated primary acid solution is then directed through valve 80 into a line 82 which is connected to a waste acid tank 84. The waste acid tank 84 preferably has a capacity of not less than about 4000 gallons.

At this point, the saturated primary acid solution may be optionally purified to remove metal ions therefrom. If purification is desired, the saturated primary acid solution from the waste acid tank 84 is routed through a line 86 into a primary filtration system 88 at a preferred flow rate of about 7.5 GPM. The filtration system 88 preferably consists of a semi-permeable membrane having a micro-pore structure which prevents the passage of metal ions therethrough while allowing the passage of primary acid solution through the membrane. In a preferred embodiment, the membrane consists of a commercially available thin-film polymer structure known in the art for this purpose. Such a product is available as a proprietary structure from Desalination Systems, Inc. of Escondido, Calif. and sold under the designation "FGL-8040". The membrane permeate (consisting of purified primary acid solution) is routed via line 92 into a storage tank 93 (preferably manufactured of polyethylene by Plastics, Inc. of Commerce City, Colo.). The retentate from the filtration system 88 (a metal ion-rich liquor) is then directed through line 94 into a holding tank 96 of the same type as storage tank 93. At this stage, it is preferred that the pH of the material in the holding tank 96 be approximately 3.5. To accomplish this, it may be necessary to add water from a supply 98 through line 100 to the material leaving the holding tank 96. It should be noted that the supply 98 of water may be obtained from the initial purification process described above and illustrated in FIG. 1.

After water addition (if necessary), the material from holding tank 96 is passed via line 102 into a secondary filtration system 104 at a preferred flow rate of about 1 GPM. The secondary filtration system 104 preferably consists of a semi-permeable membrane of the same type used in the primary filtration system 88. The membrane permeate (again consisting mostly of purified primary acid solution) is directed via line 105 into the storage tank 93. The retentate (again consisting of a metal ion-rich liquor) is routed through line 106 into a waste tank 110 (preferably of the same type as storage tank 93) where it is subsequently disposed of.

Next, Phase 3 ("III") of the regeneration process is allowed to begin. Specifically, a secondary acid solution from a second containment vessel 120 is directed into the column 36 through line 122. The secondary acid solution consists of substantially the same materials as those used to form the primary acid solution. The secondary acid solution is allowed to pass through the column 36 at least once and preferably between about 2–3 times for the same reasons described above relative to the primary acid solution. Recirculation of the secondary acid solution occurs via valve 124 and line 126 which returns the secondary acid solution to the second containment vessel 120 as shown. It should be noted that after the regeneration of approximately three separate columns with the secondary acid solution, it is routed through valve 124 and line 130 into a valve 132. Thereafter, it is directed via line 134 into the first containment vessel 62 at substantially the same time as the primary acid solution therein is sent to the waste acid tank 84 or very shortly thereafter. In the alternative, the secondary acid solution may be held within line 130 by valve 132 and routed directly into the next column being treated when it is ready for entry into Phase 2 as described herein. Thus, the secondary acid solution (from a functional standpoint) becomes the primary acid solution. This is possible because the secondary acid solution is only minimally contaminated after the cleaning of three columns as noted above.

Next, in order to achieve maximum efficiency, the purified primary acid solution within the storage tank 93 is routed from the tank 93 back into Phase III of the system for passage through and regeneration of subsequent columns. In a preferred embodiment, this is accomplished by routing the purified primary acid solution through line 140 back into the second containment vessel 120 as shown in FIG. 5. In an alternative embodiment, the purified primary acid solution may be held in the storage tank 93, and routed therefrom at the appropriate time directly into the next column which enters Phase 3 without passage through any intervening containment vessels. In both embodiments, it is preferred that the purified acid solution be stabilized at a pH of about 0.5. In order to raise the pH to this level, water from a source 142 is routed into line 140 through line 146 in the embodiment of FIG. 5. Conversely, in order to lower the pH, acidic materials from the acid storage tank 68 as described above are directed through metering apparatus 70 and line 150 into line 140 as desired.

As described herein in a preferred embodiment of the invention, there is a constant recirculation and purification of acid materials in the system of the present invention. Specifically, primary acid solution (when saturated with metal ions or when desired) is routed into a waste acid tank 84. At substantially the same time, secondary acid solution is allowed to pass into the first containment vessel 62 in order to replace the primary acid solution. Simultaneously, the saturated primary acid solution is passed from the waste acid tank 84 through filtration systems 88, 104 as described herein, with the purified primary acid solution being routed back into the column regeneration system for reuse. This continuous cycle uses the acid materials of the present invention in a highly efficient manner, and greatly facilitates system operation.

Next, Phase 4 ("IV") of the regeneration process (which is optional but preferred) is initiated. Specifically, a preliminary supply 160 of rinse water (possibly obtained from the purification process of FIG. 1) is directed into the column 36 through line 162. The rinse water is allowed to pass therethrough at least once, and preferably about 2–3 times. Recirculation of the rinse water occurs through valve 166 and line 170. After this step is completed, the rinse water proceeds through valve 166 and line 172 into the remix tank 58 where it is routed via line 60 back into the supply 2 of feed water for subsequent re-purification.

Thereafter, Phase 5 ("V") of the regeneration process is initiated in which an aqueous alkali solution from an alkali storage tank 176 is directed into the column 36 through line 178. Exemplary alkali compositions suitable for use in the alkali solution include sodium bicarbonate, sodium hydroxide, and ammonia. It is preferred that these materials have a concentration level of about 10 grams/liter–30 grams/liter (in order to maintain a preferred pH in the column 36 of about 13.1). The alkali storage tank 176 is supplied by a source 180 of dry alkali material and a source 182 of water which combine and pass through line 184 into the alkali storage tank 176 (preferably consisting of a 4000 gallon fiberglass vessel with a synthetic polymer lining as manufactured by Raven Industries of Sioux Falls, S. Dak.). The alkali solution is designed to neutralize any remaining acidic materials in the column 36, and is allowed to pass therethrough at least once, and preferably about 2–3 times. Recirculation is accomplished via valve 188 and line 190. Upon completion of this step, the alkali solution is directed into valve 188 and through line 192 back into the alkali storage tank 176. In addition, after approximately 3 separate columns have been treated with the alkali solution, it may then be optionally routed from the alkali storage tank 176 via line 194 (at a preferred flow rate of about 30 GPM) into a concentrating system 196 in order to remove excess water therefrom. The concentrating system 196 preferably consists of a semi-permeable membrane which allows water to pass therethrough while preventing the passage of ionic species used to form the alkali solution. In a preferred embodiment, the membrane consists of a commercially available thin-film polymer structure having an appropriately-sized micro-pore structure which is known in the art for this purpose. Such a product is again available as a proprietary structure from Desalination Systems, Inc. of Escondido, Calif. and sold under the designation "FGL-8040". This is the same type of membrane used in filtration systems 88, 104 described above.

As noted above, the foregoing membrane used in connection with concentrating system 196 allows excess water (the permeate) to pass therethrough which is directed via line 200 into the remix tank 58 where it is routed via line 60 into the supply 2 of feed water for re-purification. The retentate, which consists of concentrated alkali solution, is then passed via line 202 back into alkali storage tank 176 for reuse. The pH of the recycled alkali solution may be adjusted as desired using the source 180 of alkali or the source 182 of water as previously discussed.

Finally, Phase 6 ("VI") is initiated in which an additional supply 210 of rinse water is directed via line 212 into the column 36. The water is allowed to pass through the column 36 at least once, and preferably about 2–3 times. Recirculation of the water is accomplished by the passage thereof through valve 214 and line 216. Upon completion of this step, the water is routed through valve 214 and line 220 into the remix tank 58 for subsequent purification as noted above.

Figure 6:
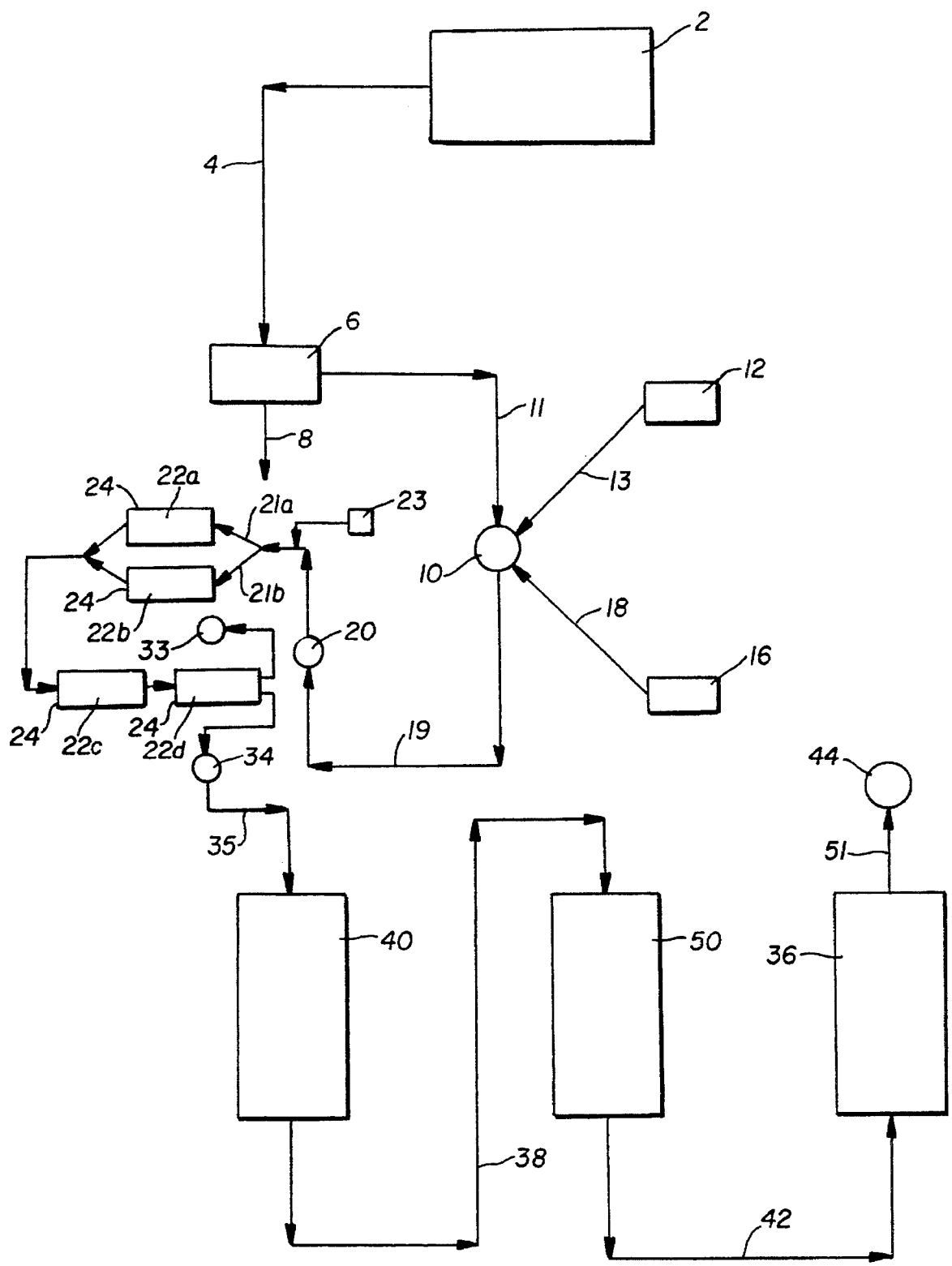
FIG. 6 is a partial schematic illustration of the process of FIG. 4 in which the regenerated first purification column is placed back in service behind the third purification column.
Figure 7:
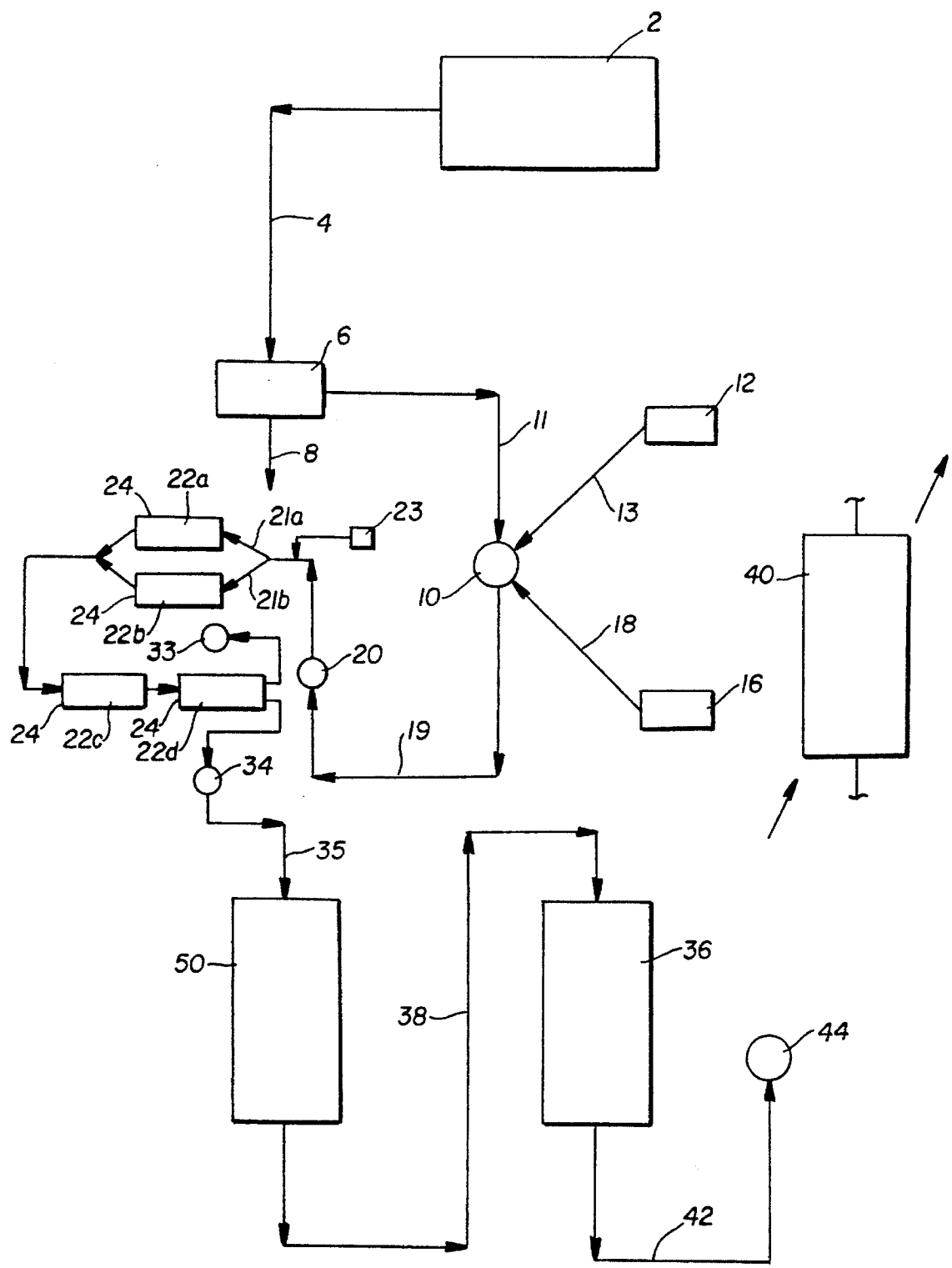
FIG. 7 is a partial schematic illustration of the process of FIG. 6 in which the second purification column in the system is taken out of service for the regeneration thereof.

At this point, the column 36 is entirely regenerated and ready for re-introduction into the water purification stage of the system. Specifically, when the column 36 is regenerated, it is disconnected (e.g. isolated) from the regeneration stage of the system. Thereafter, it is connected via line 42 to the third column 50 as illustrated in FIG. 6 in order to receive water therefrom. The output from the first column 36 is then passed into storage vessel 44 via line 51. Shortly thereafter, the second column 40 is disconnected (e.g. isolated) from the feed water supply 2 and nanofiltration membrane units 22. As a result, water to be treated is rerouted into the third column 50 (FIG. 7). Connection of the regenerated first column 36 to the water purification stage as noted above intentionally occurs before disconnection of the second column 40 from the feed water supply 2 and nanofiltration membrane units 22. This occurs because it takes less time for regeneration of a column than it takes for a column to effectively treat contaminated water and become saturated. Thus, when the first column 36 is reintroduced into the system as shown in FIG. 6, the second column 40 has not yet completed water purification to the maximum degree. Accordingly, until the second column 40 has completed its function, the system is actually operating with three columns as shown in FIG. 6.

After the second column 40 has become saturated with metal ions (as determined in the same manner relative to the first column 36), it is then operatively connected to the regeneration system of the invention and cleaned as noted above. This cycle repeats itself in a continuous manner, thereby cleaning all of the columns when needed while ensuring that the water purification process occurs in a continuous, uninterrupted manner. As a result, the entire procedure operates in a highly efficient, uninterrupted manner which enables the purification of substantial quantities of water in a minimal amount of time.

It should be noted that the column regeneration process set forth herein involving the passage of acid and alkali materials through the bead-containing columns is applicable regardless of the number of columns which may be used.

The following Example clearly illustrates the ability of the system described above to effectively purify water contaminated with metal ions in a highly efficient manner.

EXAMPLE 1

Using the procedure described above, contaminated water was treated in accordance with the present invention. The initial feed water had the following dissolved metal characteristics:

TABLE 1

| | |
|---|---|
| Temperature | 80° F. |
| pH | 4.1 |
| Ni conc. | 0.07 mg/L |
| Cu conc. | 0.01 mg/L |
| As conc. | 5.2 mg/L |
| Se conc. | 0.056 mg/L |
| Cd conc. | 12.0 mg/L |
| Pb conc. | <0.05 mg/L |
| Zn conc. | 37.8 mg/L |
| Tl conc. | <0.1 mg/L |
| Fe conc. | 0.4 mg/L |
| Mn conc. | 6.25 mg/L |
| Cr conc. | <0.05 mg/L |
| Ag conc. | <0.01 mg/L |
| Tot. dissolved metals | approx. 61.966 mg/L |

The feed water from the filter 6 (e.g. a conventional bag filter) entered the filtration stage (e.g. nanofiltration membrane units 22) of the system at a flow rate of 16 GPM and pressure of 150 psi. Fifteen Desal-5 nanofiltration membrane cartridges 24 were used in series. Each cartridge 24 was approximately 40 inches long with a diameter of about 4 inches. It was not necessary to adjust the pH of the feed water since it fell within the 3.5–7.5 optimum range described above, and sulfate addition was not undertaken.

After passing through the nanofiltration membrane cartridges 24, the feed water had the following dissolved metal characteristics set forth in Table 2:

TABLE 2

| Temperature | 80° F. |
|---|---|
| pH | 4.2 |
| Ni conc. | <0.025 mg/L |
| Cu conc. | <0.01 mg/L |
| As conc. | 3.2 mg/L |
| Se conc. | 0.031 mg/L |
| Cd conc. | 3.6 mg/L |
| Pb conc. | <0.05 mg/L |
| Zn conc. | 6.25 mg/L |
| Tl conc. | <0.1 mg/L |
| Fe conc. | 0.3 mg/L |
| Mn conc. | 1.22 mg/L |
| Cr conc. | <0.05 mg/L |
| Ag conc. | <0.01 mg/L |
| Tot. dissolved metals | approx. <14.846 mg/L |

Thus, it is evident that use of the nanofiltration stage resulted in a considerable decrease in the amount of metal ions in the initial feed water. Concentrations of some metal ions (e.g. Cr at<0.05 mg/L) appeared to remain unchanged because they were below the laboratory detection limits at the outset with respect to the initial feed water. However, the considerable decrease in total dissolved metals is a unique and important characteristic of the nanofiltration process. The filtered water was then directed into the first column 36 and the second column 40 for additional purification. Both the first and second columns 36, 40 were operated at a retention time of 5 minutes/column, and a column flow rate of 10BV/hour. The purified water leaving the second column 40 had the following characteristics:

TABLE 3

| Temperature | 70° F. |
|---|---|
| pH | 7.2 |
| Ni conc. | <0.025 mg/L |
| Cu conc. | <0.01 mg/L |
| As conc. | <0.002 mg/L |
| Se conc. | 0.012 mg/L |
| Cd conc. | 0.02 mg/L |
| Pb conc. | <0.05 mg/L |
| Zn conc. | <0.01 mg/L |
| Tl conc. | <0.1 mg/L |
| Fe conc. | <0.1 mg/L |
| Mn conc. | 0.08 mg/L |
| Cr conc. | <0.05 mg/L |
| Ag conc. | <0.01 mg/L |
| Tot. dissolved metals | approx. <0.469 |

Thus, the resulting purified water includes considerably reduced amounts of the listed metal ions compared with the amount of dissolved metals therein prior to treatment, and is suitable for discharge into the environment in compliance with applicable state and federal laws.

The present invention represents an extremely efficient method for removing dissolved metals (e.g. metal ions) from waste water. The combination of nanofiltration and treatment using beads having metal ion extractants therein (e.g. biomass materials) represents a considerable advance in water treatment technology. Furthermore, the combination of such technologies enables water with high concentrations of metal ions to be treated in a much more efficient manner compared with, for example, the use of biomass beads alone. For example, if water containing more than 50 ppm of total dissolved metals is treated using beads alone, frequent and numerous column cleaning stages will be necessary, thereby reducing the efficiency of the entire operation. The number and frequency of column cleaning stages will be considerably reduced if nanofiltration is used. Specifically, waste water entering the bead-containing columns will have a lower initial concentration of dissolved metals due to prior removal thereof by the nanofiltration system.

As described above, the foregoing system effectively treats waste liquid (e.g. water) so that metal ions may be removed therefrom. However, in accordance with the present invention, liquid materials containing valuable metal ions may also be treated to remove metal ions therefrom so that a metal ion concentrate may be obtained. This process is particularly valuable in the mining industry, especially in the area of copper production.

B. TREATMENT OF LIQUID PRODUCTS GENERATED IN THE LEACHING OF METAL ORES

An alternative embodiment of the present invention shall now be described with reference to FIG. 8. Basically, the invention in this embodiment is part of an integrated process for recovering copper ions from a chemical solution used in the leaching of copper ore materials. The processes associated with the "heap leaching" and solvent extraction of copper ore have been used in various forms for many years. As discussed in Arbiter, N. et al, "Copper hydrometallurgy—evolution and milestones", *Mining Engineering*, February 1994 (pp. 118–123) which is incorporated herein by reference, the heap leaching of copper ore basically involves the formation of large heaps or piles of ore-containing rock, followed by the application of an acidic "lixivant" solution to each pile. An exemplary and preferred lixivant solution suitable for this purpose consists primarily of $H_2SO_4$. This type of lixivant operates effectively to extract copper from most types of ore, including copper oxide ores. Lixivants containing $H_2SO_4$ will also function effectively in connection with copper sulfide ores, although it may be desirable to add an iron-containing compound/additive (e.g. $Fe_2(SO_4)_3$) to the lixivant. The addition of such materials in order to facilitate the leaching process is well known in the art as described in Arbiter, N. et al., supra, p. 119.

After downward passage (percolation) of the lixivant through the piles of ore, a liquid product is produced which contains substantial amounts of dissolved copper (e.g. copper ions) therein. This liquid product must then be treated to remove copper ions therefrom in the most efficient manner possible. A preferred method for treating the liquid product involves a process called "solvent extraction/electrowinning" or "SX/EW" which is well known in the art and discussed in Arbiter, N. et al., supra. In general, the SX/EW process first involves solvent extraction of the liquid product using a variety of chemical reagents including but not limited to hydroxyphenyl oximes. As described in Arbiter, N., et al., supra, p. 119, exemplary oximes will include but not be limited to $(C_6H_3)(R)(OH)NOHA$ wherein $R=C_9H_{19}$ or $C_{12}H_{25}$, and A=H (if salicyl alkoximes are involved). If ketoximes are being used, $A=CH_3$ or $C_6H_5$. The solvent extraction process produces a copper ion product which may thereafter be treated by conventional electrowinning. Electrowinning involves the use of a cathode/anode system in which metallic cations (e.g. copper ions) are plated onto the cathode. The generation of a low-volume copper ion concentrate prior to the SX/EW process in accordance with the present invention is of particular importance because such a concentrate is easier to handle (e.g. less physical bulk), requires smaller amounts of chemical reagents (extractants), and takes substantially less energy to treat in the electrowinning process compared with a large-volume, highly-diluted metal ion-containing solution. Energy consumption is of considerable importance in the metals processing industry, especially with respect to copper leaching operations.

The acidic liquid remaining after copper ion removal is then recycled for subsequent treatment of additional ore, collected for other uses, purified to remove residual metal ions therefrom (described in greater detail below) or discarded. Thus, the rapid and effective generation of a copper ion concentrate from the foregoing liquid product is of considerable value in the copper production industry.

In the past, many complex methods have been used to remove copper ions from liquid products as discussed in Arbiter, N. et al., supra. Exemplary methods include: (1) precipitation of cement copper with metallic iron; (2) precipitation of copper sulfide with $H_2S$ (or other soluble sulfide materials), followed by flotation; (3) precipitation of metallic copper powder with $SO_2$ gas; and (4) $H_2$ reduction of acid leach solutions to obtain copper powder. However, electrowinning as previously described is the preferred method for copper production. Electrowinning enables a high quality product to be generated in an economical manner. To ensure that the electrowinning process proceeds in the most rapid and efficient manner possible, a copper ion concentrate of the type described above must be produced. The present invention involves a highly effective method for generating such a concentrate, with the claimed method being characterized by a minimal degree of complexity and the absence of elaborate equipment.

Figure 8:
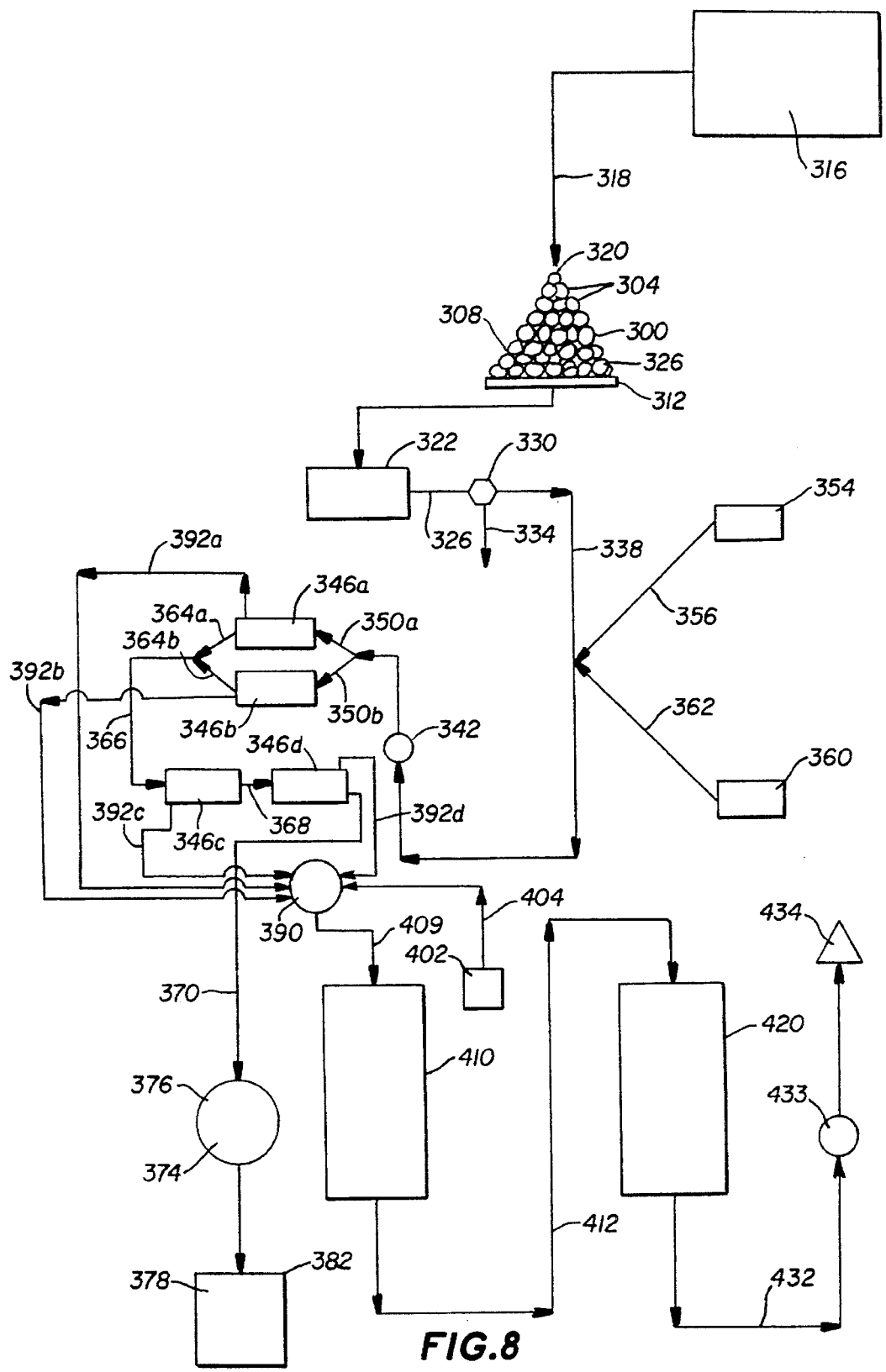
FIG. 8 is a is a partial schematic illustration involving the removal of metal ions from a liquid product generated during the chemical leaching of metal-containing ore in accordance with the present invention.

With reference to FIG. 8, an alternative embodiment of the present invention designed to produce a copper ion concentrate from a lixivant solution used in copper ore treatment is schematically illustrated. As shown in FIG. 8, a supply 300 of rock materials 304 comprised of copper ore is initially provided which is configured in a heap or pile 308. The term "rock materials" as used herein may involve discrete portions of rock having an average diameter of about 3–12 inches, crushed/powered rock, or large sections/deposits of ore which are treated "in-situ" as further described below. In a preferred embodiment, the pile 308 is placed on a pad 312 manufactured of rubber or any other composition which is substantially inert relative to acidic materials (e.g. $H_2SO_4$). Thereafter, an acidic lixivant 316 consisting primarily of $H_2SO_4$ is applied to the pile 308 through line 318. While the acid concentration of the lixivant 316 may be varied in accordance with a wide variety of parameters including but not limited to the type and character of the ore being treated, an exemplary lixivant 316 will include about 10–100 g/l of concentrated (approx. 97%) $H_2SO_4$ therein. Lixivant materials normally used in connection with the acid leaching of copper ore will have an initial pH of about 1.0–2.0. However, these parameters may again vary in view of the type of ore materials being processed, as well as the amount of such materials to be treated and other factors.

The lixivant 316 is introduced into the pile 308 of rock materials 304 at the top 320 thereof. Thereafter, the lixivant 316 is allowed to pass downwardly (e.g. percolate) through the pile 308, extracting copper ions from the rock materials 304 (ore) as it passes therethrough. The resulting liquid product 322 which consists of the leachate derived from the rock materials 304 is then collected as it exits the pile 308 at the bottom 326 thereof. Further information regarding the leaching of copper is again described in Arbiter, N. et al., supra.

At this point, the liquid product 322 will contain residual (e.g. remaining/excess) amounts of $H_2SO_4$ therein derived from the original lixivant 316, as well as a substantial amount of dissolved copper (copper ions) obtained from the ore. While the amount of copper ions in the liquid product 322 will necessarily vary based on specific reaction conditions and the type of ore being treated, an average copper ion concentration of about 1.0–3.0 g/l of liquid product 322 can be expected. In addition, dissolved iron (iron ions) may also be present in the liquid product 322. These iron ions can originate from the ore being treated, depending on the chemical characteristics thereof. Alternatively, if an iron-containing compound (e.g. $Fe_2(SO_4)_3$) is combined with the lixivant 316 as described above, this procedure will add increased amounts of dissolved iron to the liquid product 322. Under most circumstances, the liquid product 322 will contain an average of about 3–5 g/l of dissolved iron (e.g. iron ions) therein. Variations within the foregoing range will depend on whether iron-containing additives will be used. Also, the foregoing range represents an average value. Dissolved iron concentrations above and below this range may also exist, depending on a wide variety of external factors including but not limited to the chemical character of the ore and the reaction conditions being employed.

Finally, the liquid product 322 may contain substantial amounts of dissolved calcium (e.g. calcium ions) therein. Calcium may originate in the ore materials being treated and/or may be present in the water used to prepare the lixivant 316, depending on its level of "hardness". Further information regarding the presence of dissolved calcium and iron in the liquid product 322 and the problems these materials can cause will be discussed in greater detail below.

The liquid product 322 may thereafter pass via line 326 into an optional solids filter 330 which is used to remove extraneous particulate matter from the liquid product 322. In a preferred embodiment, the solids filter 330 will consist of a backwashable sand bed filter known in the art or other conventional system of comparable design (e.g. a standard, commercially-available bag filter). Solid materials trapped by the solids filter 330 are ultimately routed out of the system for disposal through line 334.

After passage through the optional solids filter 330, the liquid product 322 is passed via line 338 through at least one pump 342 (e.g. of a conventional centrifugal or positive displacement variety) and delivered to at least one and preferably multiple nanofiltration membrane units 346 (346a–346d) so that the liquid product 322 may flow onto (e.g. come in contact with) the nanofiltration membranes associated therewith. The nanofiltration membrane units 346 are preferably of the same type described above relative to the nanofiltration membrane units 22 illustrated in FIG. 1. An exemplary commercial nanofiltration membrane unit 346 suitable for use in this embodiment of the present invention is produced by Desalination Systems, Inc. of Escondido, Calif. under the name "Desal-5". This membrane unit is of the same type illustrated in FIG. 2 which is described in substantial detail above. Accordingly, all of the information provided above relative to nanofiltration membrane units 22 shall therefore be applicable to nanofiltration membrane units 346. While other types of commercially available nanofiltration membranes may also be used in this embodiment of the present invention, the foregoing "Desal-5" membrane system is preferred because it is can be constructed with moderately thick (wide) feed spacers (up to about 45 mil thick) which resist fouling of the membranes during use. As illustrated in FIG. 2, layers 31 in the cartridge 24 schematically represent the feed spacer layers. The feed spacer materials within cartridge 24 form flow spaces therein and generate a substantial amount of internal turbulence within the cartridge 24. As a result, increased shear forces at the surfaces of the membrane materials within the cartridge 24 are generated by incoming liquid materials. These increased shear forces reduce membrane fouling caused by particulate materials and the like which enter the cartridge 24.

As illustrated in the system of FIG. 8, the liquid product 322 is divided into dual streams 350a and 350b, with stream 350a entering nanofiltration membrane unit 346a and stream 350b entering nanofiltration membrane unit 346b. At this point in the treatment process, the nanofiltration membrane units 346a, 346b are operating in parallel with each other. Thereafter, as described in further detail below, the retentate materials from nanofiltration membrane units 346a, 346b converge and enter nanofiltration membrane units 346c–346d which are arranged in series. As a result, the retentate materials are further concentrated as they proceed through the system. It should be noted that this embodiment of the present invention shall not be limited to any specific arrangement of nanofiltration membrane units 346. They may be arranged in series, in parallel, or in a combination of both. The ultimate arrangement of nanofiltration membrane units 346 will depend on a variety of factors including but not limited to metal ion concentration, the size of the membrane units 346, the amount of liquid product 322 to be treated, and the incoming flow rate. For example, in applications involving a supply of liquid product 322 having a relatively high incoming flow rate (e.g. exceeding about 30 GPM), the liquid product 322 is preferably divided into a plurality of streams 350a, 350b as noted above, which are processed using a system wherein the initial nanofiltration membrane units 346a, 346b are arranged in parallel with the remaining units 346c–346d being arranged in series as shown in FIG. 8. This technique enables relatively large initial feed streams to be handled and treated in a more rapid and efficient manner without overloading the entire system. In addition, the ultimate number of nanofiltration membrane units 346 will likewise vary, depending on the amount of liquid product 322 to be treated, the copper ion concentration of the liquid product 322, and the initial flow rate. Thus, the present invention shall not be limited to any particular arrangement or number of individual nanofiltration membrane units 346 which may involve a single unit 346 or multiple units 346.

The use of multiple nanofiltration membrane units (as described in greater detail below) enables the retentate materials generated by the system to become increasingly concentrated with the movement thereof through additional membrane units. Specifically, in a system which involves multiple membrane units 346 (e.g. of the type schematically illustrated in FIG. 8), the retentate from each membrane unit 346 becomes more concentrated as it is routed into successive membrane units 346 due to the additional removal of liquid permeate materials at each nanofiltration stage. Depending on numerous factors including the type, character, and amount of liquid product 322 to be filtered, the use of multiple membrane units 346 can therefore produce a highly concentrated final product. However, the selection of any given membrane unit arrangement/configuration shall be determined in accordance with preliminary pilot studies on the liquid products being filtered. Also, the invention shall not be limited to any particular flow rate into the nanofiltration membrane units 346. In a preferred embodiment, the liquid product 322 will be delivered to the foregoing nanofiltration system at an exemplary flow rate ranging from about 100–5000 GPM (gallons per minute), again depending on a wide variety of factors including the size and quantity of membrane units 346 being used and the chemical character of the liquid product 322. Also, a preferred flux rate associated with nanofiltration as described above will not exceed about 20 GFD (gallon/ft²/day), although this value may be varied based on operating conditions and variances in the liquid products being filtered.

Because of the acidic character of the lixivant 316 as described above, the liquid product 322 will normally have a pH of about 1.5–3.0 prior to entering the nanofiltration membrane units 346. This pH level is of considerable value in that it prevents dissolved iron within the liquid product 322 as described above from causing problems during passage of the liquid product 322 through the nanofiltration membrane units 346. In most cases involving liquid product pH levels less than about 3.5, iron ions will not form solid precipitates (e.g. iron sulfates) in the liquid product 322. The formation of such precipitates is highly undesirable in that they can foul (e.g. clog) the nanofiltration membrane units 346. Fouling of the membrane units 346 in this manner increases system down-time, and reduces the overall efficiency of the entire treatment process. Thus, the pH of the liquid product 322 prior to entry into the membrane units 346 should be less than about 3.5. Since the normal acidic character of the liquid product 322 will result in a pH value below 3.5 as noted above, iron precipitate materials should not form during filtration.

However, if the pH value of the liquid product 322 prior to nanofiltration does, in fact, equal or exceed about 3.5 due to the use of a weakly-acidic lixivant, the existence of alkali materials in the ore being treated, and/or other external factors which raise the pH of the liquid product 322, additional acid materials may be needed to lower the pH thereof. Specifically, if the pH of the liquid product 322 prior to nanofiltration is about 3.5 or greater as noted above, an additional supply of acid 354 is preferably added via line 356 to the liquid product 322 prior to entry thereof into the nanofiltration membrane units 346 (e.g. into line 338 upstream or downstream from the pump 342, with upstream addition being preferred). In a preferred and optimum embodiment, the additional supply of acid 354 will consist of the same type of acid initially used to manufacture the lixivant 316 (e.g. concentrated [about 97%] $H_2SO_4$). Other types of acid which may be used include but are not limited to hydrochloric acid, phosphoric acid, and the like. However, the use of sulfuric acid ($H_2SO_4$) is preferred in that it provides a substantial amount of sulfate ($SO_4^{-2}$) ions to the liquid product 322 prior to nanofiltration. As previously discussed, nanofiltration efficiency is facilitated and enhanced through the presence of sulfate anions in the liquid materials being filtered. If the other acids listed above are used for pH adjustment, it may nonetheless be appropriate to combine such acids with an additional quantity of $H_2SO_4$. In this type of system, the primary function of the $H_2SO_4$ would involve the addition of sulfate ions to the liquid product 322, while the other acid materials would function primarily as the pH adjusting agents. However, it is important to note that the present invention shall not be exclusively limited to the use of any particular acid materials for pH adjustment, as well as any specific type of acid/sulfate combinations. The use of these materials and the quantities thereof shall be determined in accordance with preliminary pilot studies on the liquid products being treated. With continued reference to FIG. 8, the additional supply of acid 354 will be added in an amount sufficient to decrease the pH of the liquid product 322 to less than about 3.5 as noted above. The amount of additional acid 354 to be used for this purpose will depend on numerous factors including the chemical character (e.g. acidity) of the liquid product 322, the amount of liquid product 322 to be filtered, and other extrinsic factors. Preliminary pilot tests using established pH measurement/adjustment techniques and equipment may be used in connection with the liquid product of interest to determine the need for acid addition, as well as the amount of acid to be added. Specifically, through the use of standard and conventional pH testing equipment, the pH of the liquid product 322 may be determined prior to nanofiltration and during the addition of acid 354 from the foregoing supply until a level less than about 3.5 is reached. As a general rule regarding the use of acid 354 which is subject to modification under appropriate circumstances, a preferred embodiment of the invention will involve the use of about 2.0–5.0 g of concentrated (e.g. about 97%) $H_2SO_4$ per liter of liquid product 322. It should also be noted that the acid 354 may be added to the liquid product 322 as a routine practice without conducting preliminary analyses of the iron ion content or pH thereof.

As indicated above, the liquid product 322 may also have various amounts of dissolved calcium (e.g. calcium ions) therein. Dissolved calcium within the liquid product 322 may be derived from the particular ores being treated and/or can result from the use of "hard" water to prepare the initial lixivant 316. During nanofiltration, substantial amounts of calcium ions in the liquid product 322 may ultimately cause the formation of calcium precipitates (e.g. $CaSO_4$) therein. Such precipitates can again clog (e.g. foul) the nanofiltration membrane units 346, thereby reducing the operational efficiency of the entire processing system. To prevent this problem from occurring, at least one antiscalant composition 360 may optionally be added to the liquid product 322 via line 362 (FIG. 8) prior to nanofiltration. The antiscalant composition may be added to the system via lines 362 and 338 either upstream or downstream from the pump 342, with upstream addition being preferred. As noted above, use of the antiscalant composition 360 is appropriate when the liquid product 322 contains substantial amounts of dissolved calcium (e.g. calcium ions). In particular, when the liquid product 322 contains more than about 0.5 g/l of calcium ions therein, use of the antiscalant composition 360 is especially desirable. The antiscalant composition 360 effectively prevents the formation of solid calcium precipitates by forming soluble calcium complexes which do not interfere with nanofiltration. Numerous commercially available antiscalant compositions may be used for the purposes set forth herein, and the present invention shall not be limited any particular antiscalant material. Exemplary antiscalant compositions suitable for use in the present invention include but are not limited to sodium hexametaphosphate, sodium polyacrylate in water (commercially available from the American Cyanamid Company of Wayne, N.J. (USA) under the name "Cyanamer P-70"), and a composition designated as "J-Poly MW-200" which is sold by Summit Laboratories, Inc. of Denver, Colo. (USA). In addition, other compositions known in the art for scale inhibition may also be used in the present invention for the purposes described above. The amount of antiscalant composition 360 to be used will depend on numerous factors, including but not limited to the chemical character (e.g. calcium ion concentration) of the liquid product 322, the pH of the liquid product 322, and other factors. In this regard, preliminary pilot tests on samples of the liquid product 322 to be treated may be used to determine whether use of the antiscalant composition 360 is appropriate, and how much antiscalant composition 360 should be used. However, as a general rule, the liquid product 322 will preferably contain about 10–30 ppm of antiscalant composition 360 with this quantity being subject to change as conditions warrant. It should also be noted that the antiscalant composition 360 may simply be added to the liquid product 322 in the foregoing amount or in other quantities as a routine practice without conducting preliminary analyses of the calcium ion content thereof.

Upon passage/delivery of the liquid product 322 into the nanofiltration system illustrated in FIG. 8, the retentate materials (e.g. copper ions) from nanofiltration membrane units 346a, 346b will respectively flow through lines 364a, 364b and combine within line 366. At this point, the retentate materials within line 366 will collectively flow into nanofiltration membrane unit 346c for further concentration (e.g. additional removal of liquid permeate materials). After movement through nanofiltration membrane unit 346c, the concentrated retentate materials will thereafter flow through line 368 and into nanofiltration membrane unit 346d for additional concentration. Thereafter, the concentrated retentate materials will flow out of the nanofiltration membrane unit 346d via line 370. The materials received from line 370 will consist of a retentate product 374 which specifically involves a metal (copper) ion concentrate 376. The metal ion concentrate 376 includes copper ions therein derived from the liquid product 322. The metal ion concentrate 376 will normally have a volume which is about 50–75% less than the total volume of the liquid product 322 prior to nanofiltration. However, substantially all of the copper ions initially present in the liquid product 322 will reside within the retentate product 374, thereby producing a metal ion concentrate 376 having a minimal volume with substantial amounts of copper ions therein. The concentrate 376 will likewise include considerable amounts of sulfate ions therein which were derived from the $H_2SO_4$ in the original lixivant 316. In most cases, about 90–99% of the copper ions initially present in the liquid product 322 will be collected by the selected nanofiltration system, and will reside within the retentate product 374/metal ion concentrate 376. This high degree of filtration efficiency is an important benefit associated with the use of nanofiltration technology.

The resulting metal ion concentrate 376 may thereafter be directed to a selected recovery system 378 which optimally consists of a standard solvent extraction/electrowinning system 382 known in the art and generally described above. In this regard, it is a considerable advantage of the present invention that a metal ion concentrate 376 of the type described above may be produced which is especially suitable for the SX/EW process and the like. It is a further advantage of the invention that this goal is achieved in a highly efficient manner using a minimal number of process steps and equipment. The following Example illustrates the efficiency of the foregoing process in producing a copper ion concentrate from an acidic liquid product used in the leaching of copper ore:

EXAMPLE 2

In this Example, a liquid product generated from the leaching of copper ore using an acidic lixivant is described. The lixivant contained $H_2SO_4$ therein, and was substantially the same type of composition used in connection with lixivant 316 described above. The liquid product received after leaching was passed through a nanofiltration membrane system at a flow rate of about 5 GPM. The nanofiltration membrane system used in this Example consisted of a single 4 inch diameter nanofiltration membrane cartridge produced by Desalination Systems, Inc. of Escondido, Calif. under the name "Desal-5". This type of cartridge is described above and schematically illustrated in FIG. 2. Approximately 50 gallons of liquid product were nanofiltered using the foregoing system. No additional acids or antiscalants were added to the liquid product prior to nanofiltration since they were not needed in accordance with the parameters set forth above. The retentate material generated by passage of the liquid product through the nanofiltration membrane cartridge was repeatedly recirculated into the cartridge for further concentration until approximately 25 gallons of retentate product (metal ion concentrate) were produced. Qualitative data generated in connection with this retentate product is summarized below in Table 4:

TABLE 4

| Material | Amt. of Fe (mg/l) | Amt. of Cu (mg/l) | pH |
|---|---|---|---|
| Liquid product prior to filtration | 3350.0 | 1150.0 | 2.1 |
| Retentate (metal ion concentrate) | 6800.0 | 2270.0 | 2.0 |
| Permeate (liquid which passed through the filtration system) | 7.6 | 8.5 | 2.0 |

The foregoing Example clearly illustrates the effectiveness of the present invention in producing a copper ion concentrate in a highly effective manner without the need for elaborate equipment and complex chemical processes. Specifically, the use of nanofiltration as described above produced a concentrate product having approximately twice as much copper therein per unit volume as the initial liquid product prior to filtration. This type of concentrate is ideally suited to the production of metallic copper using conventional treatment methods including but not limited to electrowinning.

Referring back to FIG. 8, the foregoing nanofiltration process also generates a permeate 390 which is received from lines 392a–392d which are respectively connected to nanofiltration membrane units 346a–346d. Specifically, as individual quantities of liquid permeate are generated from each of the nanofiltration membrane units 346a–346d, they are removed on a separate basis via lines 392a–392d to collectively produce permeate 390. The permeate 390 consists primarily of an aqueous acidic solution which nonetheless includes very small amounts of residual metal ions therein (e.g. copper, iron, and/or other ions) which managed to escape the nanofiltration process. The permeate 390 may thereafter be used in connection with additional leaching processes or discarded as desired. Alternatively, the permeate 390 may be treated to remove residual metal ions therefrom so that it can be used in a substantially pure form for a variety of other purposes. This alternative is especially useful when the entire copper processing operation is completed and further leaching of ore materials is not desired.

In the present invention, purification of the permeate 390 to remove residual metal ions therefrom would generate a substantially purified acidic solution which could be used for numerous other purposes in the metal processing industry and in other, unrelated industries. To accomplish purification of the permeate 390, it may be passed through polymer beads containing metal ion extracting agents therein (e.g. biomass materials) of the same type described above relative to the materials used in columns 36, 40. Specifically, as noted above, the foregoing bead materials are described in U.S. Pat. No. 5,279,745 to Jeffers et al. and specifically involve polymeric beads made of polysulfone, cellulose acetate, or other organic polymers having various metal ion extracting agents therein. Exemplary metal ion extracting agents include but are not limited to selected biomass materials (e.g. peat moss, yeast, algae, molds, xanthan gum, guar gum, alginates, and mixtures thereof). Other extracting agents include but are not limited to triisooctyl amine, di-2-ethylhexyl phosphoric acid, tri-octyl methylammonium chloride, 2-hydroxy-5-dodecyl-benzophenone oxime, and di-2-4,4-trimethylpentyl phosphinic acid. Such bead materials with metal ion extractants therein are commercially available from Harrison Western Environmental Services, Inc. of Lakewood, Colo. (USA).

Treatment of the permeate 390 using the foregoing bead materials is undertaken in substantially the same manner set forth above regarding treatment of metal ion-contaminated water (e.g. see FIGS. 1–7 and the description associated therewith). Thus, all of the previously-stated information regarding bead treatment of contaminated water is applicable to the embodiment of FIG. 8. It should be noted that the pH of the permeate 390 will normally be about 1.5–3.0. The metal extracting capabilities of the bead materials are reduced with decreasing pH levels of the liquids being treated. In this regard, the bead materials may not function effectively in the presence of liquid compositions having a pH of about 3.5 or less. As noted above, acid materials having a very low pH are normally used to strip the bead materials of entrained ions. If the pH of the permeate 390 is about 3.5 or less, then it is preferred that the pH of the permeate 390 be increased so that it exceeds about 3.5. Adjustment of the pH to exceed about 3.5 becomes of increasing interest in proportion to the acidity of permeate 390. Specifically, as lower pH levels are encountered relative to permeate 390, the need for pH adjustment increases so that the bead materials will work in an effective manner. In a preferred embodiment, pH adjustment of the permeate 390 is accomplished by the addition of an alkali composition to the permeate 390 prior to bead treatment. As schematically illustrated in FIG. 8, a supply of an aqueous alkali composition (solution) 402 may be delivered to the permeate 390 via line 404. Exemplary alkali compositions suitable for this purpose include but are not limited to sodium hydroxide, sodium bicarbonate, and ammonia. After alkali addition, the permeate 390 is tested in a conventional manner to determine if the desired pH level has been achieved. Preliminary pilot tests using established pH measurement/adjustment techniques and equipment may be used in connection with the permeate 390 to determine the need for alkali addition, as well as the amount of alkali to be added. Specifically, through the use of standard and conventional pH testing equipment, the pH of the permeate 390 may be determined prior to bead treatment and during the addition of alkali composition 402 until a pH level greater than about 3.5 is reached. While the amount of alkali composition 402 to be added will vary based on numerous parameters, a general rule would involve the addition of about 1.0–2.0 g of alkali composition 402 per liter of permeate 390. It should also be noted that the foregoing predetermined quantity of alkali composition 402 or other amounts thereof may be added to the permeate 390 as a routine practice without conducting preliminary pH analyses on the permeate 390.

In order to remove any residual metal ions from the permeate 390 (with or without alkali addition), it is passed via line 409 through a column 410 which, by way of example, would consist of a 4000 gallon vinyl ester resin-lined steel tank manufactured by Eaton Metal Products of Denver, Colo. This tank is equipped with a hub and lateral water distribution system produced by Mattson, Inc. of Barrington, Ill. It is approximately 8 feet in diameter and 9.8 feet long. Furthermore, it is preferably equipped with an air vent system manufactured by Taco, Inc. (Model No. 409) of Cranston, R.I.

The column 410 is filled with beads in an amount less than the capacity of the column 410. For example, if the column 410 has a capacity of 4000 gallons, then approximately 3000 gallons of beads are preferably used. The beads to be used are of the type described above. In a preferred embodiment, they are prepared from polysulfone materials, and have sphagnum peat moss entrained therein as the selected biomass material.

As the incoming permeate 390 passes through the column 410, metal ions within the permeate 390 are extracted and retained within the beads. Accordingly, the permeate 390 passing out of the column 410 through line 412 will be nearly depleted of dissolved metals.

However, in order to remove any further residual metal ions which remain in the permeate 390 after passage through the column 410, the permeate 390 in a preferred embodiment is passed via line 412 into a second column 420. The second column 420 is filled with the metal ion-extracting beads described above, and is structurally/functionally identical to the first column 410. In a preferred embodiment wherein the first column 410 and the second column 420 each have a capacity of about 4000 gallons with about 3000 gallons of beads therein, the permeate 390 passing through each column will have an average retention time of about 10 minutes, and a flow rate of about 6BV ("bed volumes")/hour.

The resulting product received from the second column 420 via line 432 consists of a supply of purified permeate 433 which is ultimately collected in a storage vessel 434. This material is substantially free from residual metal ions, and may thereafter be used for numerous desired purposes. Specifically, the purified permeate 433 will typically include less than about 1 ppm of total dissolved metals therein which is a substantially negligible quantity. At this point, the purification process is completed.

It should be noted that, while a two column system is illustrated in FIG. 8 for example purposes, any number of columns (e.g. one or more) may be used, depending on the type and quantity of the permeate materials being treated, as well as the degree to which such materials are contaminated. The number of columns to be used (as well as other parameters described herein) may be suitably varied within the scope of the invention as determined by preliminary pilot studies and tests on the specific compositions to be treated. Also, the columns 410, 420 may be regenerated (e.g. stripped of bound metal ions) using the procedures previously discussed and illustrated in FIG. 5.

The embodiment described herein and schematically shown in FIG. 8 represents an advance in the art of metal recovery technology as it relates to the leaching of copper-containing ore materials. Metal recovery from lixivant solutions is undertaken in a rapid and efficient manner without the need for complex equipment and elaborate treatment processes. A substantial need has existed for such a system which is clearly satisfied by the present invention. Furthermore, it should be noted that generation and treatment of the foregoing copper-containing liquid products shall not be exclusively limited to heap leaching systems. A comparable liquid product having the characteristics described above may also be obtained as a result of (1) vat leaching of copper ore whereby a pile of rock or powdered rock is leached in an enclosed vat/chamber using the lixivant materials set forth above; (2) "in situ" leaching processes wherein the lixivant is placed in a pit formed within an ore-containing portion of rock or within a tunnel through a solid portion of ore; and/or (3) agitation leaching in which the selected lixivant is combined with finely-divided rock materials (e.g. flotation tailings) within a chamber or vat. The present invention shall likewise be applicable to all of these alterative copper leaching methods, and the resulting liquid product may be treated to produce a metal ion concentrate in the same manner set forth above.

Having herein described preferred embodiments of the present invention, it is anticipated that suitable modifications may be made thereto by individuals skilled in the relevant art which nonetheless remain within the scope of the invention. For example, within the general parameters set forth above, the specific hardware and components used to implement the processes provided herein may be suitably varied while remaining within the scope of the invention. Likewise, the foregoing processes may involve a selectively variable number of bead or resin containing columns and nanofiltration membranes. Thus, the present invention shall be construed only in accordance with the following claims:

The invention that is claimed is:

1. A method for recovering copper from a lixivant solution used in leaching copper from copper ore materials comprising:

providing a supply of copper ore;

applying an acidic lixivant solution comprising $H_2SO_4$ therein to said copper ore, said lixivant solution extracting copper from said copper ore as said lixivant solution comes in contact therewith in order to generate a liquid product comprising copper ions therein;

providing at least one nanofiltration membrane capable of preventing passage of said copper ions therethrough;

delivering said liquid product to said nanofiltration membrane so that said liquid product flows onto said nanofiltration membrane in order to produce a retentate which does not pass through said nanofiltration membrane and a permeate which passes through said nanofiltration membrane; and removing said retentate from said nanofiltration membrane, said retentate comprising a metal ion concentrate comprising said copper ions therein.

2. The method of claim 1 wherein said delivering of said liquid product to said nanofiltration membrane occurs at a rate of about 100–5000 GPM.

3. A method for recovering copper from a lixivant solution used in leaching copper from copper ore materials comprising:

providing a supply of copper ore;

applying an acidic lixivant solution comprising $H_2SO_4$ therein to said copper ore, said lixivant solution extracting copper from said copper ore as said lixivant solution comes in contact therewith in order to generate a liquid product comprising copper ions therein;

adding at least one antiscalant composition to said liquid product;

providing at least one nanofiltration membrane capable of preventing passage of said copper ions therethrough;

delivering said liquid product to said nanofiltration membrane so that said liquid product flows onto said nanofiltration membrane in order to produce a retentate which does not pass through said nanofiltration membrane and a permeate which passes through said nanofiltration membrane; and removing said retentate from said nanofiltration membrane, said retentate comprising a metal ion concentrate comprising said copper ions therein.

4. The method of claim 3 wherein said delivering of said liquid product to said nanofiltration membrane occurs at a rate of about 100–5000 GPM.

5. A method for recovering copper from a lixivant solution used in leaching copper from copper ore materials comprising:

providing a supply of copper ore;

applying an acidic lixivant solution comprising $H_2SO_4$ therein to said copper ore, said lixivant solution extracting copper from said copper ore as said lixivant solution comes in contact therewith in order to generate a liquid product comprising copper ions therein;

combining said liquid product with an additional supply of acid so that said liquid product will comprise a pH of less than about 3.5;

providing at least one nanofiltration membrane capable of preventing passage of said copper ions therethrough;

delivering said liquid product to said nanofiltration membrane so that said liquid product flows onto said nanofiltration membrane in order to produce a retentate which does not pass through said nanofiltration membrane and a permeate which passes through said nanofiltration membrane; and removing said retentate from said nanofiltration membrane, said retentate comprising a metal ion concentrate comprising said copper ions therein.

6. The method of claim 5 further comprising the step of adding at least one antiscaleant composition to said liquid product.

7. The method of claim 5 wherein said delivering of said liquid product to said nanofiltration membrane occurs at a rate of about 100–5000 GPM.

8. The method of claim 5 wherein said additional supply of acid is comprised of $H_2SO_4$.

9. A method for recovering copper from a lixivant solution used in leaching copper from copper ore materials comprising:

providing a supply of copper ore;

applying an acidic lixivant solution to said copper ore, said lixivant solution extracting copper from said copper ore as said lixivant solution comes in contact therewith in order to generate a liquid product comprising copper ions therein;

providing at least one nanofiltration membrane capable of preventing passage of said copper ions therethrough;

delivering said liquid product to said nanofiltration membrane so that said liquid product flows onto said nanofiltration membrane in order to produce a retentate which does not pass through said nanofiltration membrane and a permeate which passes through said nanofiltration membrane;

removing said retentate from said nanofiltration membrane, said retentate comprising a metal ion concentrate comprising said copper ions therein;

providing a supply of porous polymer beads each comprising a metal ion extracting agent therein, said metal ion extracting agent comprising at least one organic biomass composition; and passing said permeate through said polymer beads in order to remove any metal ions from said permeate which were not removed by said nanofiltration membrane, said passing of said permeate through said polymer beads causing said metal ions in said permeate to be retained within said beads by said metal ion extracting agent.

10. The method of claim 9 further comprising the step of adding at least one alkali composition to said permeate prior to said passing of said permeate through said polymer beads.

11. A method for recovering copper from a lixivant solution used in leaching copper from copper ore materials comprising:

providing a supply of copper ore;

applying an acidic lixivant solution to said copper ore, said lixivant solution extracting copper from said copper ore as said lixivant solution comes in contact therewith in order to generate a liquid product comprising copper ions therein;

adding at least one antiscalant composition to said liquid product;

providing at least one nanofiltration membrane capable of preventing passage of said copper ions therethrough;

delivering said liquid product to said nanofiltration membrane so that said liquid product flows onto said nanofiltration membrane in order to produce a retentate which does not pass through said nanofiltration membrane and a permeate which passes through said nanofiltration membrane;

removing said retentate from said nanofiltration membrane, said retentate comprising a metal ion concentrate comprising said copper ions therein;

providing a supply of porous polymer beads each comprising a metal ion extracting agent therein, said metal ion extracting agent comprising at least one organic biomass composition; and passing said permeate through said polymer beads in order to remove any metal ions from said permeate which were not removed by said nanofiltration membrane, said passing of said permeate through said polymer beads causing said metal ions in said permeate to be retained within said beads by said metal ion extracting agent.

12. The method of claim 11 further comprising the step of adding at least one alkali composition to said permeate prior to said passing of said permeate through said polymer beads.

13. A method for recovering copper from a lixivant solution used in leaching copper from copper ore materials comprising:

providing a supply of copper ore;

applying an acidic lixivant solution to said copper ore, said lixivant solution extracting copper from said copper ore as said lixivant solution comes in contact therewith in order to generate a liquid product comprising copper ions therein;

combining said liquid product with an additional supply of acid so that said liquid product will comprise a pH of less than about 3.5;

providing at least one nanofiltration membrane capable of preventing passage of said copper ions therethrough;

delivering said liquid product to said nanofiltration membrane so that said liquid product flows onto said nanofiltration membrane in order to produce a retentate which does not pass through said nanofiltration membrane and a permeate which passes through said nanofiltration membrane;

removing said retentate from said nanofiltration membrane, said retentate comprising a metal ion concentrate comprising said copper ions therein;

providing a supply of porous polymer beads each comprising a metal ion extracting agent therein, said metal ion extracting agent comprising at least one organic biomass composition; and passing said permeate through said polymer beads in order to remove any metal ions from said permeate which were not removed by said nanofiltration membrane, said passing of said permeate through said polymer beads causing said metal ions in said permeate to be retained within said beads by said metal ion extracting agent.

14. The method of claim 13 further comprising the step of adding at least one alkali composition to said permeate prior to said passing of said permeate through said polymer beads.

* * * * *